(12) United States Patent
Otomaru et al.

(10) Patent No.: US 12,499,570 B2
(45) Date of Patent: Dec. 16, 2025

(54) IMAGE PROCESSING APPARATUS, MEDICAL IMAGE CAPTURING APPARATUS, IMAGE PROCESSING METHOD, AND STORAGE MEDIUM

(71) Applicants: CANON KABUSHIKI KAISHA, Tokyo (JP); CANON MEDICAL SYSTEMS CORPORATION, Tochigi (JP)

(72) Inventors: Itaru Otomaru, Kanagawa (JP); Kiyohide Satoh, Kanagawa (JP); Yuta Narukiyo, Tokyo (JP)

(73) Assignees: CANON KABUSHIKI KAISHA, Tokyo (JP); CANON MEDICAL SYSTEMS CORPORATION, Tochigi (JP)

( * ) Notice: Subject to any disclaimer, the term of this patent is extended or adjusted under 35 U.S.C. 154(b) by 979 days.

(21) Appl. No.: 17/574,724

(22) Filed: Jan. 13, 2022

(65) Prior Publication Data

US 2022/0230346 A1 Jul. 21, 2022

(30) Foreign Application Priority Data

Jan. 20, 2021 (JP) .................. 2021-007311

(51) Int. Cl.
*G06T 7/64* (2017.01)
*G06N 3/045* (2023.01)
(Continued)

(52) U.S. Cl.
CPC .............. *G06T 7/64* (2017.01); *G06N 3/045* (2023.01); *G06T 3/02* (2024.01); *G06T 3/40* (2013.01);
(Continued)

(58) Field of Classification Search
CPC .... G06T 7/60; G06T 7/62; G06T 7/64; G06T 7/73; G06T 7/74; G06T 7/75; G06V 10/32
See application file for complete search history.

(56) References Cited

U.S. PATENT DOCUMENTS 9,053,536 B2 6/2015 Imamura et al.
9,396,576 B2 7/2016 Miyasa et al.
(Continued)

FOREIGN PATENT DOCUMENTS

JP 2004-267393 A 9/2004
JP 2009-178423 A 8/2009
JP 2015-073798 A 4/2015

OTHER PUBLICATIONS

Notice of Reasons for Refusal issued by the Japanese Patent Office on Oct. 25, 2024 in corresponding JP Patent Application No. 2021-007311, with English translation.

*Primary Examiner* — Wen W Huang
(74) *Attorney, Agent, or Firm* — Carter, DeLuca & Farrell LLP

(57) ABSTRACT

An image processing apparatus comprises: a model obtaining unit configured to obtain a learned model that has learned, based on a position of a predetermined feature point, a contour of a target in an image obtained by capturing the target; an image obtaining unit configured to obtain an input image; a position obtaining unit configured to obtain a position of an input point input on the input image by a user; a normalization unit configured to obtain a normalized image generated by coordinate-transforming the input image such that the position of the input point matches the position of the predetermined feature point in the learned model; and an estimation unit configured to estimate the contour of the target in the input image using the normalized image and the learned model.

23 Claims, 8 Drawing Sheets

(51) Int. Cl.

| | | |
|---|---|---|
| *G06T 3/02* | (2024.01) | |
| *G06T 3/40* | (2024.01) | |
| *G06T 3/60* | (2024.01) | |
| *G06T 7/00* | (2017.01) | |
| *G06T 7/73* | (2017.01) | |
| *G06T 11/00* | (2006.01) | |
| *G06V 10/22* | (2022.01) | |
| *G06V 10/32* | (2022.01) | |
| *G06V 10/44* | (2022.01) | |
| *G06V 10/75* | (2022.01) | |
| *G06V 10/774* | (2022.01) | |
| *G06V 10/82* | (2022.01) | |
| *G16H 30/40* | (2018.01) | |

(52) U.S. Cl.
CPC .............. *G06T 3/60* (2013.01); *G06T 7/0012* (2013.01); *G06T 7/75* (2017.01); *G06T 11/00* (2013.01); *G06V 10/235* (2022.01); *G06V 10/32* (2022.01); *G06V 10/449* (2022.01); *G06V 10/752* (2022.01); *G06V 10/7747* (2022.01); *G06V 10/82* (2022.01); *G16H 30/40* (2018.01); *G06T 2207/20081* (2013.01); *G06T 2207/20084* (2013.01); *G06T 2207/20101* (2013.01); *G06T 2207/30004* (2013.01); *G06T 2207/30168* (2013.01); *G06T 2210/41* (2013.01)

(56) References Cited

U.S. PATENT DOCUMENTS

| | | |
|---|---|---|
| 9,704,294 B2 | 7/2017 | Ishida et al. |
| 9,767,619 B2 | 9/2017 | Ishizu et al. |
| 10,008,048 B2 | 6/2018 | Ishizu et al. |
| 10,019,811 B2 | 7/2018 | Endo et al. |
| 10,157,486 B2 | 12/2018 | Suzuki et al. |
| 10,268,918 B2 | 4/2019 | Otomaru et al. |
| 10,692,198 B2 | 6/2020 | Satoh et al. |
| 10,828,010 B2 | 11/2020 | Wanda et al. |
| 10,867,423 B2 | 12/2020 | Suzuki et al. |
| 2008/0226145 A1* | 9/2008 | Moriya ................. G06T 7/0012 382/128 |
| 2018/0315494 A1* | 11/2018 | Kolde .................... G16H 10/60 |
| 2019/0325557 A1* | 10/2019 | Chae ........................ G06T 5/73 |
| 2022/0198750 A1* | 6/2022 | Zhou ........................ G06T 3/16 |

* cited by examiner

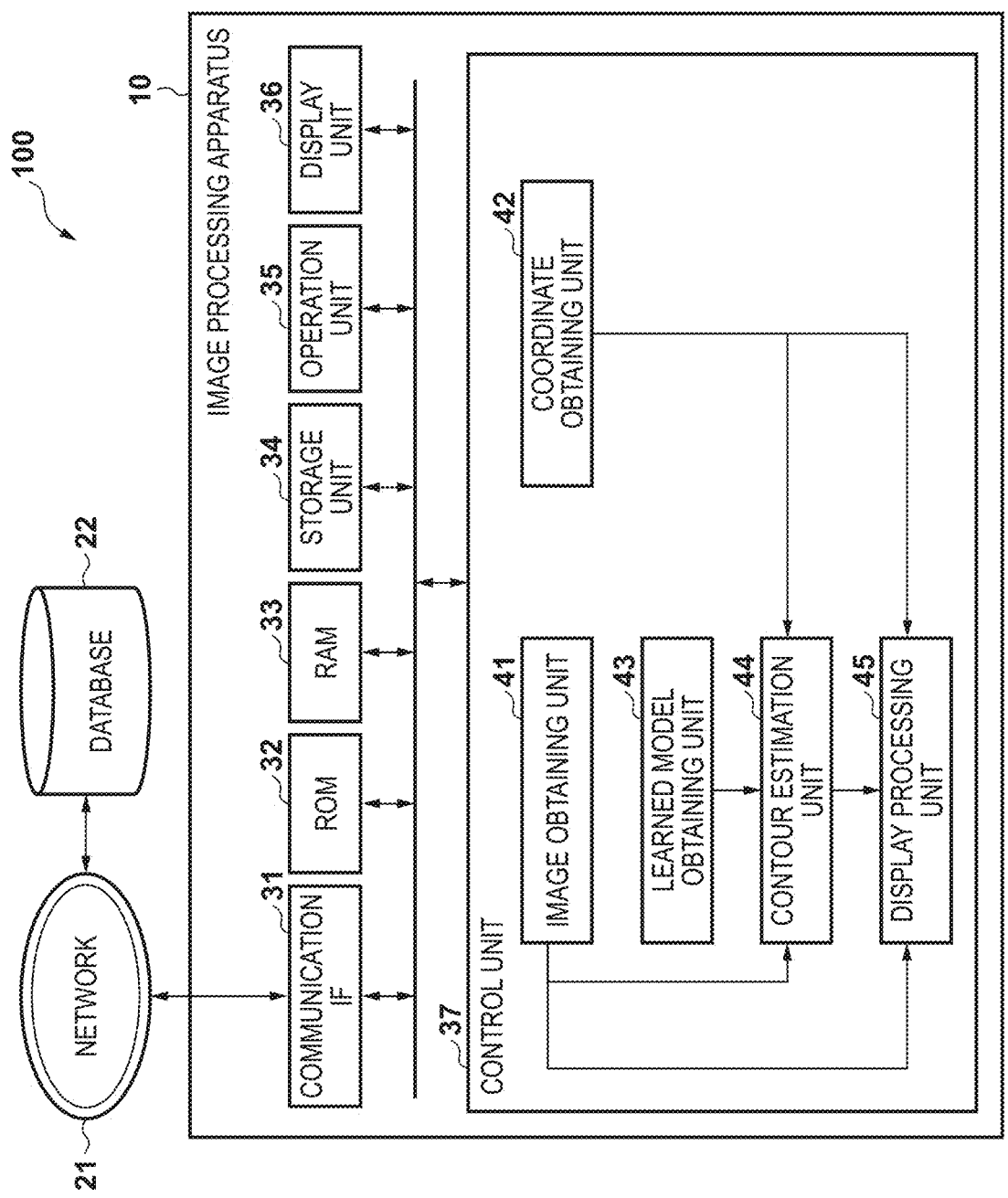

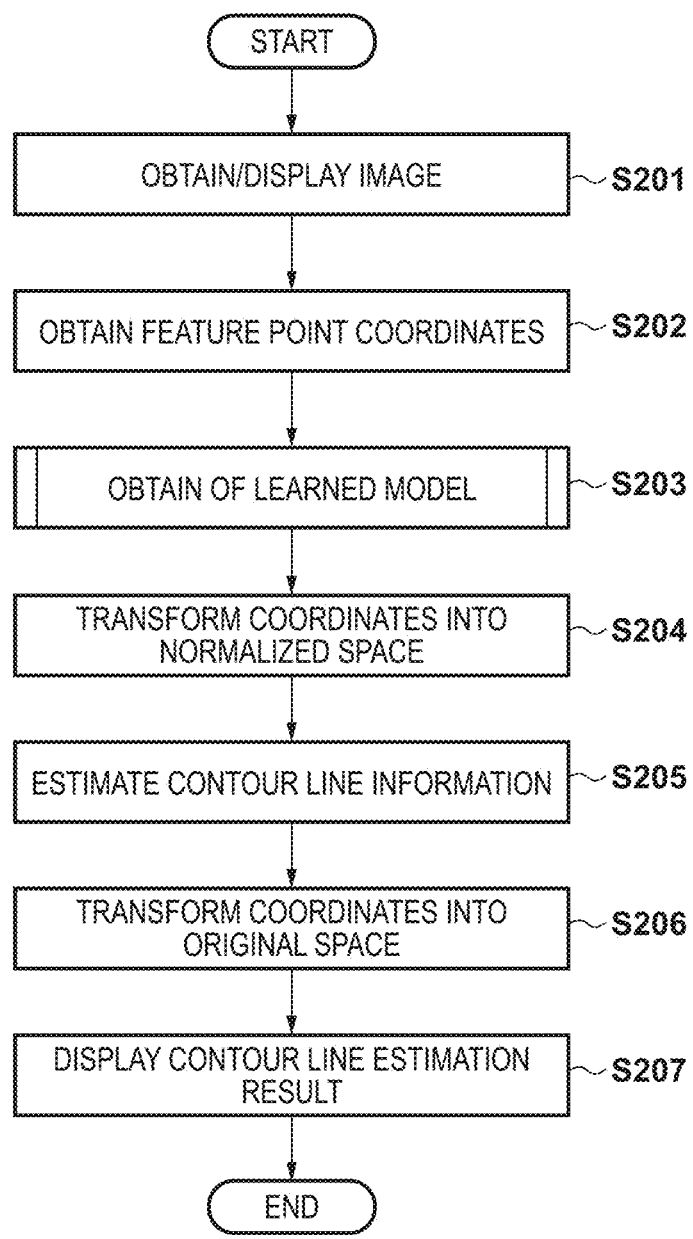

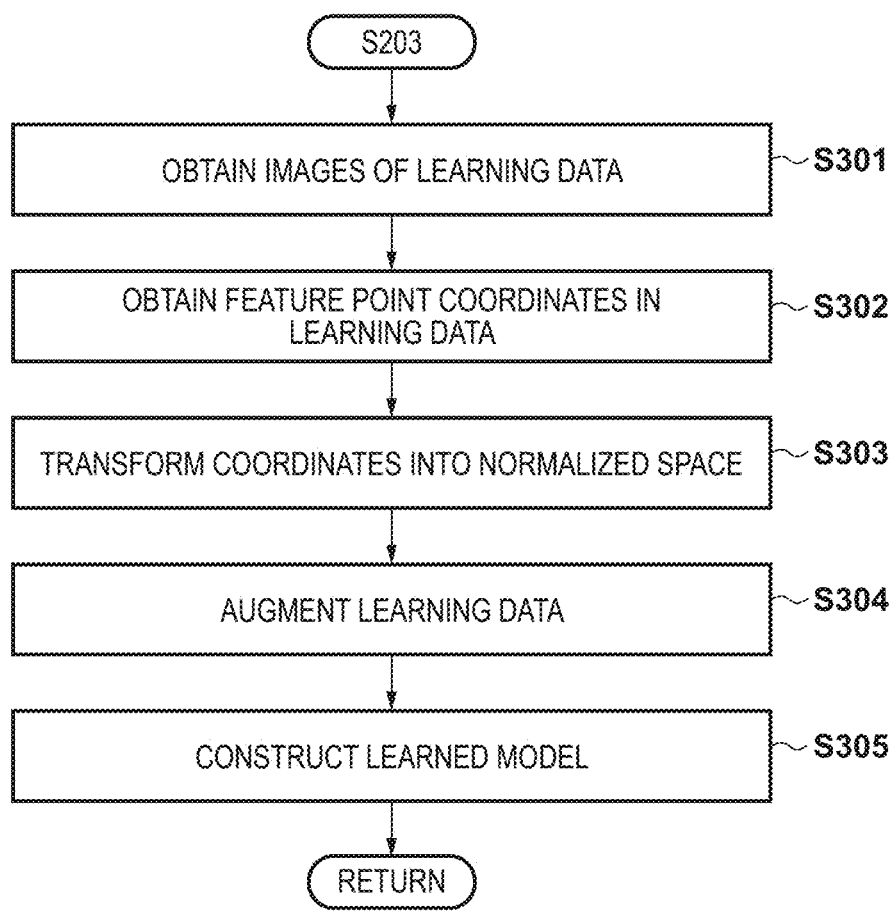

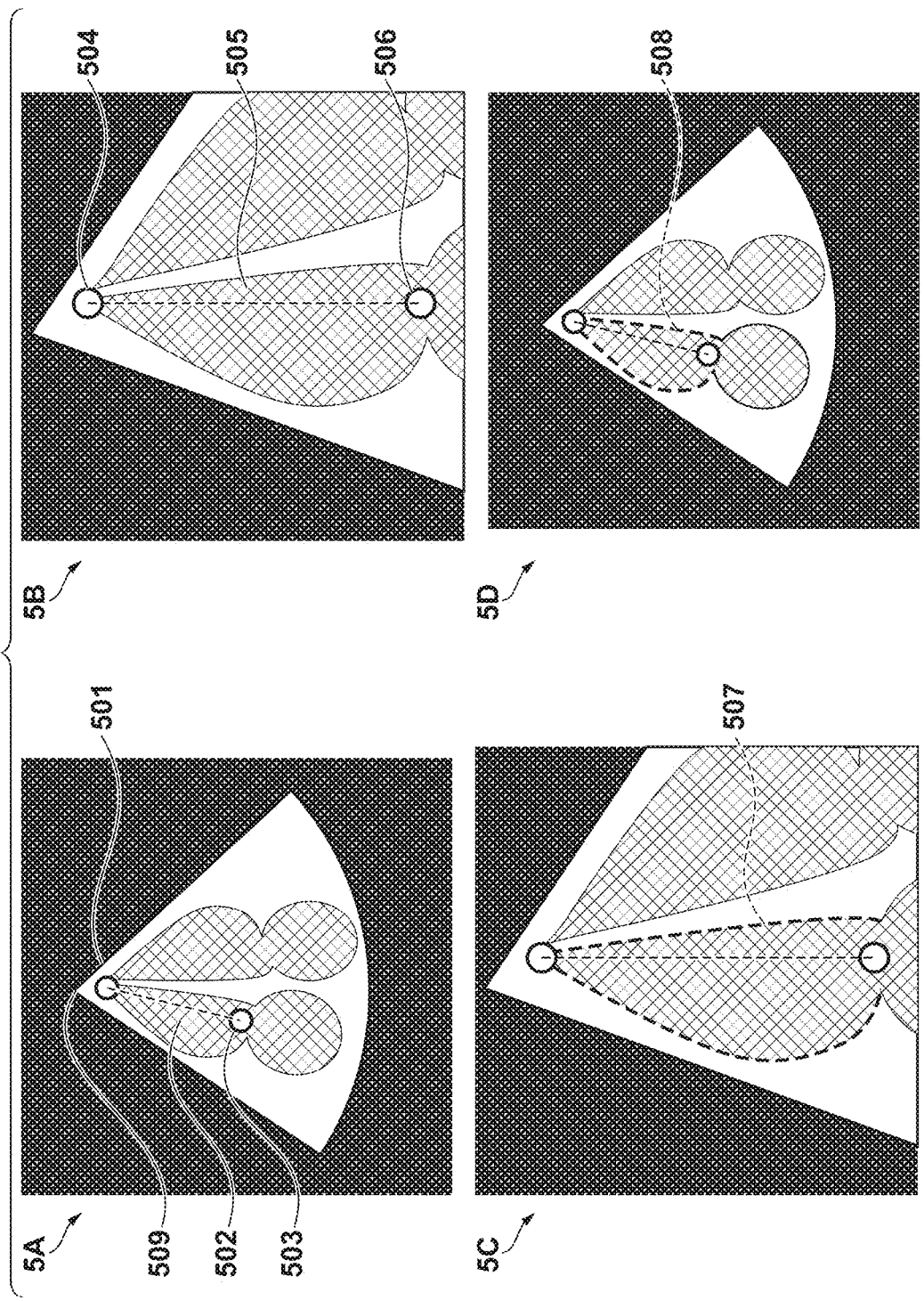

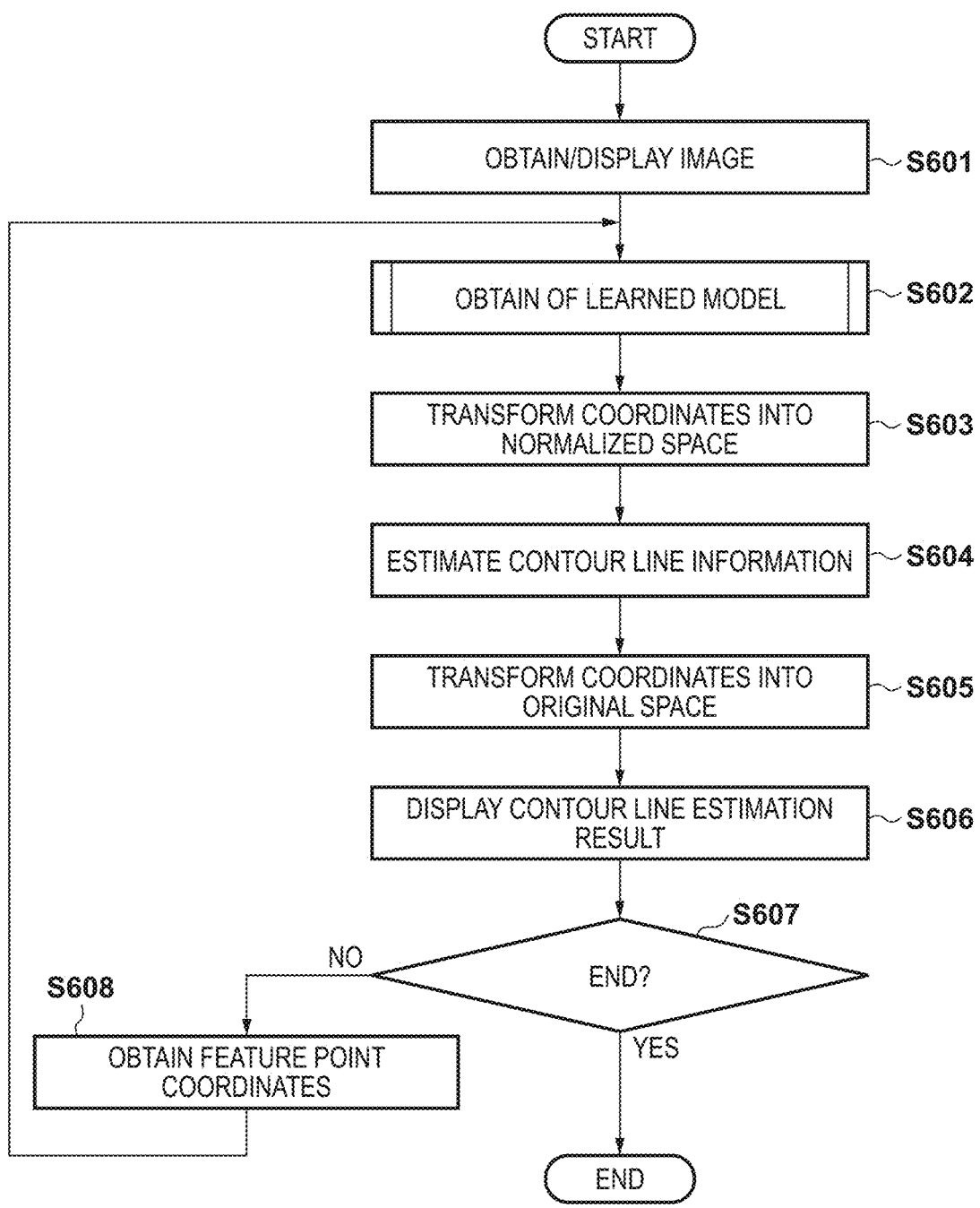

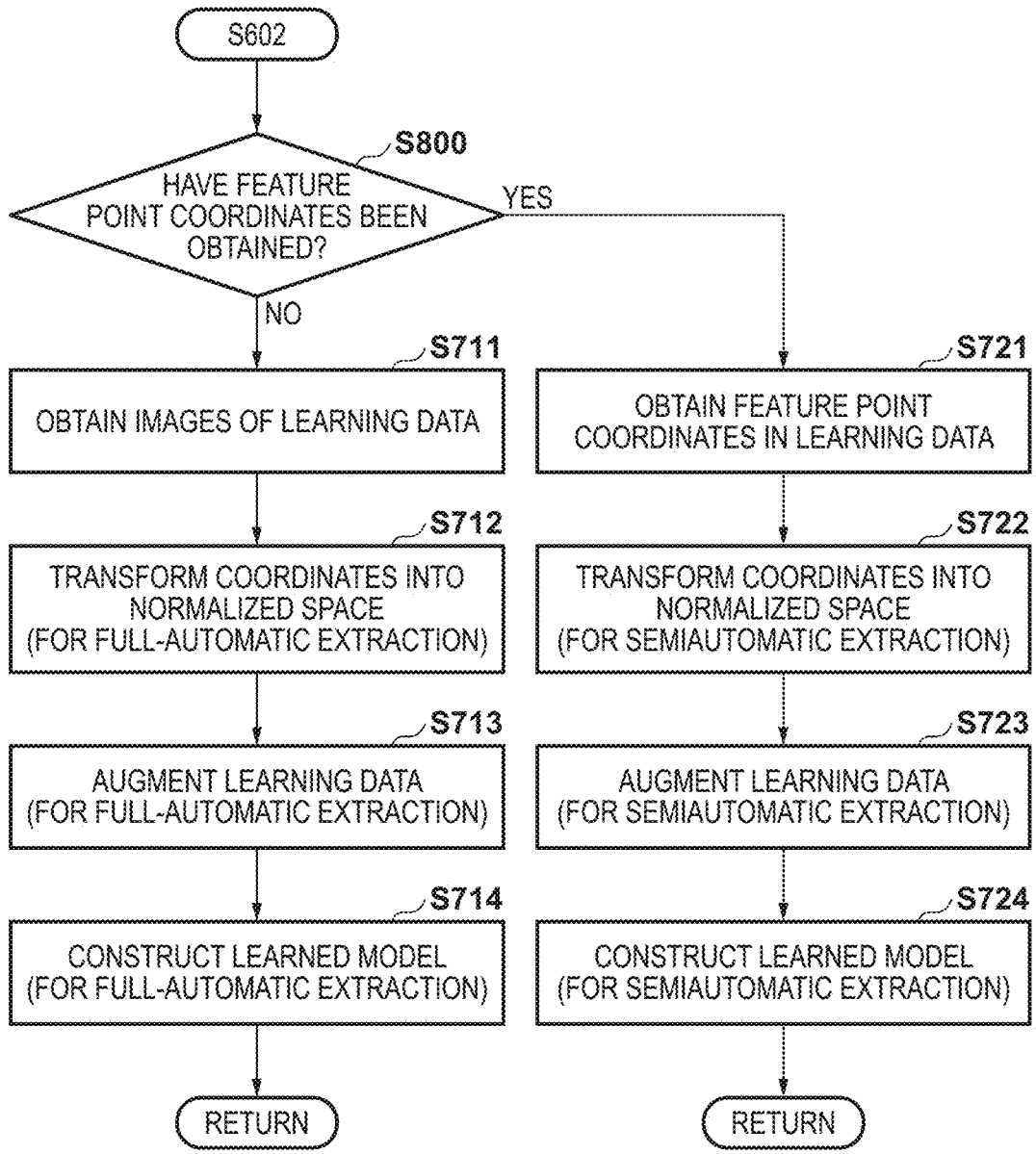

IMAGE PROCESSING APPARATUS, MEDICAL IMAGE CAPTURING APPARATUS, IMAGE PROCESSING METHOD, AND STORAGE MEDIUM

BACKGROUND OF THE INVENTION

Field of the Invention

The present invention relates to an image processing apparatus, a medical image capturing apparatus, an image processing method, and a storage medium.

Description of the Related Art

In the medical field, diagnoses using images obtained by various image diagnostic apparatuses (modalities) such as an ultrasonic image diagnostic apparatus are performed. In the diagnoses, pieces of information such as the area and volume of a region of interest captured in an image are used for a diagnosis. Here, to calculate, for example, the area of a region, contour information that is information representing the contour shape of the region needs to be estimated from an image. If this work of contour estimation is manually performed, a burden is imposed on an operator such as a doctor. To reduce the labor of the operator, various techniques for performing contour estimation have been proposed.

For example, as a technique of estimating a contour using points (input points) manually input by an operator, Japanese Patent Laid-Open No. 2015-73798 discloses a technique of performing contour estimation based on an initial contour that connects input points in a two-dimensional ultrasonic image obtained by capturing a heart region.

In the technique described in Japanese Patent Laid-Open No. 2015-73798, however, the accuracy of contour estimation depends on the accuracy of input points input by the operator. For this reason, depending on the case, it may be sometimes impossible to estimate an appropriate shape.

To solve the above-described problem, the present invention provides a technique capable of performing accurate contour estimation.

SUMMARY OF THE INVENTION

According to one aspect of the present invention, there is provided an image processing apparatus comprising: a model obtaining unit configured to obtain a learned model that has learned, based on a position of a predetermined feature point, a contour of a target in an image obtained by capturing the target; an image obtaining unit configured to obtain an input image; a position obtaining unit configured to obtain a position of an input point input on the input image by a user; a normalization unit configured to obtain a normalized image generated by coordinate-transforming the input image such that the position of the input point matches the position of the predetermined feature point in the learned model; and an estimation unit configured to estimate the contour of the target in the input image using the normalized image and the learned model.

Further features of the present invention will become apparent from the following description of exemplary embodiments (with reference to the attached drawings).

BRIEF DESCRIPTION OF THE DRAWINGS

FIG. 1 is a block diagram showing the configuration of the functions of an image processing apparatus according to each of the first to fourth embodiments;

FIG. 2 is a flowchart showing an example of the processing procedure of the image processing apparatus according to each of the first to third embodiments;

FIG. 3 is a flowchart showing an example of the procedure of learned model obtaining processing according to each of the first to third embodiments;

FIG. 5 is a view showing the procedure of contour estimation processing.

FIG. 6 is a flowchart showing an example of the processing procedure of the image processing apparatus according to the fourth embodiment;

FIG. 8 is a flowchart showing a modification of learned model obtaining processing according to the fourth embodiment.

DESCRIPTION OF THE EMBODIMENTS

Figure 4B:
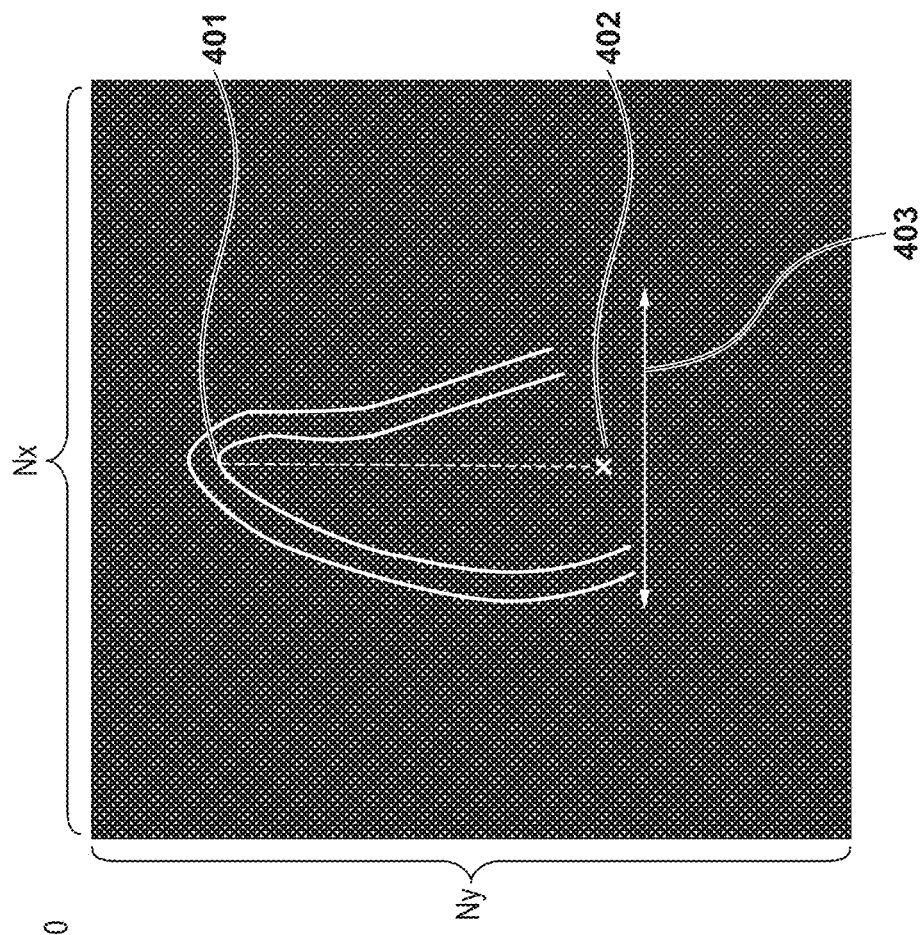
FIG. 4B is a view showing processing of augmenting learning data in learning.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

A medical image capturing apparatus according to the embodiment of the present invention includes an image processing apparatus for processing a captured image, and the image processing apparatus provides a function of estimating (extracting) the contour of an object from an input image and features points (to be referred to as input points hereinafter) input by a user on the input image. The input image to be processed is a medical image, that is, an image of an object (for example, a human body), which is captured or generated for the purpose of medical diagnoses, inspections, studies, or the like, and is typically an image obtained by an image capturing system called a modality.

For example, an ultrasonic image obtained by an ultrasonic diagnostic apparatus, an X-ray CT image obtained by an X-ray CT apparatus, an MRI image obtained by an MRI apparatus, and the like can be processing targets. The input image may be a two-dimensional image or a three-dimensional image, or may be an image of one time phase or images or a plurality of time phases. A region of interest (target) is a partial region in an image, and is, for example, an anatomic structure (for example, an organ, a blood vessel, or a bone), a lesion, or the like. What is to be selected as the region of interest (target) can arbitrarily be set.

A detailed example of the image processing apparatus according to the embodiment of the present invention will be described below using an example in which the contour of the right ventricle of a heart is estimated as a target from a two-dimensional ultrasonic image.

First Embodiment

In the first embodiment, contour estimation using input points by a user is called semiautomatic contour estimation.

A configuration will be described, which performs contour estimation of a target by semiautomatic estimation in a normalized space coordinate-transformed by the coordinate values of predetermined feature points (input points) input on an input image. In this embodiment, contour estimation of a region of interest, which is performed by the image processing apparatus (or system) based on feature points manually input by the user, is called semiautomatic estimation. The image processing apparatus to be described in this embodiment performs contour estimation of a target by semiautomatic estimation using feature points (input points) manually input by the user.

The image processing apparatus according to the first embodiment has a function of automatically estimating (extracting) the contour of a right ventricle that is a target from an input image and the coordinates of predetermined feature points (input points) input by the user on the input image. Here, the contour (contour information) of the target is expressed by the coordinates of a predetermined number of (to be referred to as Np hereinafter) point groups (contour point groups) arranged on the contour.

The image processing apparatus according to this embodiment estimates the contour (contour information) of a target based on a learned model (statistical model) constructed from learning data by statistical processing. Here, the learning data is formed by the images (samples) of a plurality of cases for each of which the correct answer of contour information of a target is known. In addition, each image of learning data is given the coordinates of predetermined feature points. Construction of the learned model is done in a normalized space in which each image of the learning data is coordinate-transformed such that the feature points are located at the same predetermined coordinates (for example, for each type of feature points representing the cardiac apex position of a heart chamber, and the like). Similar normalization processing is performed using the input points, and contour estimation of the input image is then executed.

In this way, the image processing apparatus according to this embodiment can estimate the contour of the right ventricle based on the statistical tendency of the learned model in a state in which the coordinate values of the input points are fixed in the normalized space (a state in which the input points are coordinate-transformed into the same predetermined coordinates). Note that in this embodiment, a configuration for estimating the contour information of a right ventricle as an example of a target will be described. However, the target is not limited to a right ventricle, and the configuration can also be applied to a case in which the contour of another part including a left ventricle, a left atrium, and a right atrium or the contour a region that combines the plurality of regions is estimated.

The configuration of the functions of an image processing apparatus 10 according to this embodiment and processing to be executed by the image processing apparatus 10 will be described below with reference to FIG. 1. FIG. 1 is a block diagram showing an example of the configuration of an image processing system 100 (to be also referred to as a medical image processing system) including the image processing apparatus 10 according to this embodiment. The image processing system 100 includes the image processing apparatus 10 and a database 22. The image processing apparatus 10 is communicably connected to the database 22 via a network 21. The network 21 includes, for example, a LAN (Local Area Network) or a WAN (Wide Area Network).

The database 22 holds and manages a plurality of images and a plurality of pieces of information. The information managed in the database 22 includes an input image to be subjected to contour estimation processing by the image processing apparatus 10, and learning data used to generate a learned model. Here, the information managed in the database 22 may include, in place of the learning data, the information of a learned model generated from the learning data. The information of the learned model may be stored not in the database 22 but in the internal storage (a ROM 32 or a storage unit 34) of the image processing apparatus 10. The image processing apparatus 10 can obtain the data held in the database 22 via the network 21.

The image processing apparatus 10 includes a communication IF (Interface) 31 (communication unit), the ROM (Read Only Memory) 32, a RAM (Random Access Memory) 33, the storage unit 34, an operation unit 35, a display unit 36, and a control unit 37.

The communication IF 31 (communication unit) is formed by a LAN card or the like, and implements communication between the image processing apparatus 10 and an external apparatus (for example, the database 22). The ROM 32 is formed by a nonvolatile memory or the like, and stores various kinds of programs and various kinds of data. The RAM 33 is formed by a volatile memory or the like and used as a work memory that temporarily stores a program or data under execution. The storage unit 34 is formed by an HDD (Hard Disk Drive) or the like, and stores various kinds of programs and various kinds of data.

The operation unit 35 is formed by a keyboard, a mouse, a touch panel, or the like, and inputs instructions from a user (for example, a doctor or a laboratory technician) to various kinds of apparatuses.

The display unit 36 is formed by a display or the like, and displays various kinds of information to the user.

The control unit 37 is formed by a CPU (Central Processing Unit) or the like, and generally controls processing in the image processing apparatus 10. The control unit 37 includes, as its functional components, an image obtaining unit 41, a position obtaining unit 42, a learned model obtaining unit 43, a contour estimation unit 44, and a display processing unit 45. The control unit 37 may include a GPU (Graphics Processing Unit), a DSP (Digital Signal Processor), an FPGA (Field-Programmable Gate Array), or the like.

(Image Obtaining Unit 41)

The image obtaining unit 41 obtains an input image (an image in which contour information is unknown) as a processing target from the database 22. The input image is a captured image of an object obtained by various kinds of modalities. In this embodiment, the input image is a two-dimensional ultrasonic image of a heart. The image obtaining unit 41 may obtain the input image directly from a modality. In this case, the image processing apparatus 10 may be implemented in the console of the modality (image capturing system). In this embodiment, an example in which the input image is a two-dimensional ultrasonic image will be described. However, the input image may be an image of another type. The method according to this embodiment can also be applied to an image of two or more dimensions (for example, a plurality of two-dimensional images, a two-dimensional moving image, a three-dimensional still image, a plurality of three-dimensional images, or a three-dimensional moving image). Also, the method is applicable independently of the type of modality.

(Position Obtaining Unit 42)

The position obtaining unit 42 obtains, as an input point, a feature point (the position of a feature point) input by the user on the input image. The position obtaining unit 42 obtains the coordinate information (position information) of predetermined feature points (input points) manually input on the input image by the user via the operation unit 35. In this embodiment, two points including the cardiac apex position of the right ventricle and the midpoint between the left and right valve annulus positions of the tricuspid valve are used as the predetermined feature points. The function of the position obtaining unit 42 will be described later in a description of step S202.

(Learned Model Obtaining Unit 43)

In addition to processing of learning the contour of a target in an image obtained by capturing the target and processing of obtaining a learned model, the learned model obtaining unit 43 has a function of obtaining (selecting) a desired learned model from learned models registered in advance in the storage unit of the image processing apparatus or a plurality of externally stored learned models. The learned model obtaining unit 43 obtains a learned model that has learned the contour of a target in an image obtained by capturing the target based on the positions of predetermined feature points. More specifically, the learned model obtaining unit 43 obtains a learned model that has learned the relationship between an image obtained by capturing a predetermined target and the contour of the target in the image, which is a learned model generated in a normalized space in which the positions of the predetermined feature points of the target are matched.

The learned model obtaining unit 43 obtains learning data from the database 22 and performs statistical analysis for the learning data. Each of samples that form the learning data includes data including pixel value information of the images of a plurality of learning cases, the contour information of targets in the learning images, and the coordinate information of predetermined feature points. More specifically, the learned model obtaining unit 43 functions as a learning data obtaining unit, and obtains, as learning data, the images of a plurality of cases, the positions of contours (the positions of contour lines) of targets in the images of the plurality of cases, and the positions of feature points of the targets in the images of the plurality of cases. Here, the feature points in the learning data represent points that are anatomically the same points as the feature points obtained by the position obtaining unit 42. That is, if the position obtaining unit 42 obtains, as feature points, two points including the cardiac apex position of the right ventricle and the midpoint between the left and right valve annulus positions of the tricuspid valve, feature points in a sample that forms learning data are two points including the cardiac apex position of the right ventricle and the midpoint between the left and right valve annulus positions of the tricuspid valve.

Then, the learned model obtaining unit 43 obtains a learned model (for example, predetermined information that constitutes a partial space representing the statistical distribution of the sample group) from the result of statistical analysis. At this time, the learned model is defined on a normalized space coordinate-transformed such that the coordinates of the feature points in each sample are set at the same coordinates (for each type of feature points). The learned model obtaining unit 43 generates a normalized image and a normalized contour by normalization processing of coordinate-transforming the images and contours of learning data into a normalized space such that the feature points in the images of the plurality of cases are located at the same positions. The learned model obtaining unit 43 functions as a normalization unit, and obtains the normalized image generated by coordinate-transforming the input image such that the positions of the input points match the positions of the feature points in the learned model. More specifically, the learned model obtaining unit 43 obtains the normalized image generated by coordinate-transforming the input image into a normalized space such that the positions of the input points match the positions of the feature points in the learned model.

In this way, when performing contour estimation using the learned model, contour information can be estimated based on the statistical distribution of the sample group in a state in which the coordinates of the feature points (input points) obtained by the position obtaining unit 42 do not change (that is, are fixed).

(Contour Estimation Unit 44)

The contour estimation unit 44 estimates the contour (contour information) of the target in the input image using the normalized image and the learned model. Here, the contour (contour information) of the target includes the position information of a contour line and contour points that form the contour line. Using the learned model obtained by the learned model obtaining unit 43, the contour estimation unit 44 estimates the contour information of the target (for example, the right ventricle) in the input image based on the input image obtained by the image obtaining unit 41 and the coordinates of the feature points (input points) set on the input image, which are obtained by the position obtaining unit 42.

The contour estimation unit 44 obtains the normalized image generated by coordinate-transforming the input image such that the positions of the input points match the positions of the feature points in the learned model. Using the normalized image and the learned model, the contour estimation unit 44 estimates the contour of the target in the input image. As detailed processing, using the information of the coordinate values of the feature points (input points), the contour estimation unit 44 coordinate-transforms the input image into the same normalized space as the normalized space in which the learned model was generated. After the contour information of the target (right ventricle) is estimated on the normalized space, the contour information in the original space is calculated by applying inverse transformation of coordinate transformation. Note that in this embodiment, in the normalized space, the pixel value information of the input image is set to known information, and the contour information of the target in the input image is set to unknown information. Then, the contour information is estimated from the pixel value information of the input image and the learned model by a matrix operation using the BPLP (Back Projection for Lost Pixels) method. Details of the BPLP will be described later.

(Display Processing Unit 45)

Based on the result of calculation by the contour estimation unit 44, the display processing unit 45 displays the input image and the estimated contour information of the target in the image display region of the display unit 36 in a display form easy to visually recognize.

The constituent elements of the above-described image processing apparatus 10 function in accordance with computer programs. For example, when the control unit 37 (CPU) reads out a computer program stored in the ROM 32 or the storage unit 34 and executes it using the RAM 33 as a work area, the functions of the constituent elements are implemented. Note that the functions of some or all of the constituent elements of the image processing apparatus 10 may be implemented using dedicated circuits. In addition, the functions of some of the constituent elements of the control unit 37 may be implemented using a cloud computer.

For example, an arithmetic device located in a place different from the image processing apparatus 10 may be communicably connected to the image processing apparatus 10 via the network 21, and the image processing apparatus 10 and the arithmetic device may transmit/receive data, thereby implementing the functions of the constituent elements of the image processing apparatus 10 or the control unit 37.

An example of the processing procedure of the image processing apparatus 10 shown in FIG. 1 will be described next with reference to the flowchart of FIG. 2.

(Step S201: Obtaining/Display of Image)

In step S201, when the user instructs, via the operation unit 35, to obtain an image, the image obtaining unit 41 obtains an input image designated by the user from the database 22 and stores the image in the RAM 33. At this time, the display processing unit 45 displays the input image in the image display region of the display unit 36. Here, an example of the input image is shown by 5A in FIG. 5.

Note that as the input image designation method, any known method can be used. For example, the user may directly designate an image on the database 22 via the operation unit 35, or the image obtaining unit 41 may automatically select, as the input image, an image that satisfies predetermined conditions from an image group designated by the user. Also, instead of obtaining the input image from the database 22, the image obtaining unit 41 may obtain the input image from images obtained by various image diagnostic apparatuses (modalities), for example, ultrasonic images captured every moment by an ultrasonic image diagnostic apparatus. For example, the latest image captured at the timing of the image obtaining instruction from the user can be obtained as the input image. Alternatively, based on the information of cardiac potentials or the like associated with images, an image of a predetermined time phase (for example, an end systole or an end diastole) captured after the timing of the obtaining instruction from the user may automatically be discriminated and obtained as the input image.

(Step S202: Obtaining of Feature Point Coordinates)

In step S202, when the user inputs, via the operation unit 35, the coordinate information of predetermined feature points on the input image displayed in the display region of the display unit 36, the position obtaining unit 42 obtains the coordinate information (position information) of the feature points (input points) manually input by the user on the input image and stores the information in the RAM 33.

5A in FIG. 5 shows an example of the coordinate information of feature points (input points). The feature points to be obtained in this embodiment are assumed to be two points including a cardiac apex position 501 and a midpoint position 503 between left and right valve annuluses. Note that the cardiac apex position 501 and the midpoint position 503 between the left and right valve annuluses are merely examples, and the two feature points to obtain coordinate information may be other than the cardiac apex and the midpoint between left and right valve annuluses. For example, two points including the position of an annulus on the right side of a tricuspid valve and the position of an annulus on the left side may be used as the feature points.

In addition, the number of feature points is not limited to two, and one point including the cardiac apex position may be used, or three points including the cardiac apex position and the positions of the left and right valve annuluses may be used. Alternatively, four or more points including the cardiac apex position and positions on a contour line between the left and right valve annuluses may be used. Based on the input from the user, the position obtaining unit 42 can obtain the coordinate information of the feature points necessary for performing input image normalization processing (step S204) to be described later.

Note that to obtain the coordinate information of the feature points, various methods can be used, and any known method can be used. For example, the user may designate coordinate information by clicking the position of each feature point on the input image using a mouse as the operation unit 35, or may designate coordinate information using a trackball. At this time, the user can also separately designate, via a UI (user interface) (not shown), information (label) used to identify a feature point represented by designated coordinate information.

Alternatively, the user may designate the coordinate positions of feature points themselves via the operation unit 35, and the position obtaining unit 42 may automatically identify, based on the designated coordinate positions of the feature points, whether the plurality of feature points are the cardiac apex and the midpoint between the left and right valve annuluses. For example, the position obtaining unit 42 can obtain, as the cardiac apex, the coordinate information of a feature point at a position close to the position of an ultrasonic probe (that is, a feature point at a position whose y-coordinate value is almost 0), and obtain, as the midpoint position between the left and right valve annuluses, the coordinate information of a feature point at a position far from the position of the ultrasonic probe. Alternatively, when the order of coordinate information to be input by the user is fixed in advance, the position obtaining unit 42 can obtain, as the cardiac apex position, the coordinate information of a first point that is input first, and obtain, as the midpoint position between the left and right valve annuluses, the coordinate information of a second point that is input next.

Also, instead of causing the user to directly designate the midpoint position between the left and right valve annuluses via the operation unit 35, the user may be caused to designate a position easy to visually recognize, and the position obtaining unit 42 may obtain the coordinate information of the midpoint between the left and right valve annuluses based on the designated position. For example, the user may be caused to designate, via the operation unit 35, the position of the left valve annulus and the position of the right valve annulus, which are easy to visually recognize, and the position obtaining unit 42 may calculate the midpoint between the position of the left valve annulus and the position of the right valve annulus, which are designated by the user, and obtain the calculated position of the midpoint as the midpoint position between the left and right valve annuluses.

In addition, the position obtaining unit 42 can also automatically detect the coordinate information of the feature points using template matching or machine learning. Also, the position obtaining unit 42 can also correct the automatically detected coordinate information of the feature points by user input via the operation unit 35.

Furthermore, the position obtaining unit 42 and the display processing unit 45 can also superimposedly display markers representing the feature points on the input image at average positions where the feature points can exist, and the position obtaining unit 42 can correct the coordinate information of the feature points at the average positions based on the positions of the markers drugged by the user.

(Step S203: Obtaining of Learned Model)

In step S203, the learned model obtaining unit 43 obtains learning data from the database 22. The learned model obtaining unit 43 then constructs a learned model using the learning data obtained from the database 22. Note that to increase the robustness of the learned model, the learning data is preferably formed by data obtained by capturing a plurality of different patients. However, the data obtained by capturing the plurality of different patients may include images obtained by capturing a single patient at different timings.

FIG. 3 is a flowchart showing an example of the procedure of learned model obtaining processing according to this embodiment. Details of processing to be performed by the learned model obtaining unit 43 will be described below with reference to the flowchart of FIG. 3.

(Step S301: Obtaining of Images of Learning Data and Correct Answer Contour)

In step S301, the learned model obtaining unit 43 obtains, from the database 22, the images of a plurality of cases (samples) that are learning data and the correct answer (correct answer contour) of the contour information of a target in the image of each sample. The contour information of the target includes the position (coordinates) of the contour line of the target in each image.

(Step S302: Obtaining of Feature Point Coordinates in Learning Data)

In step S302, the learned model obtaining unit 43 obtains, from the database 22, the coordinate information (position information) of predetermined feature points set for the image of each sample of the learning data obtained in step S301. That is, the learned model obtaining unit 43 obtains, from the database 22, the positions (coordinate information (position information)) of the feature points of the target in each image. As described above, in this embodiment, the feature points are assumed to be two points including the cardiac apex and the midpoint between the left and right valve annuluses.

Note that in the above description, the feature points set for each sample of the learning data are anatomically the same feature points as the feature points (input points) obtained in step S202. However, the feature points set for each sample of the learning data need not always be anatomically the same feature points as the feature points (input points).

If the feature points set for each sample of the learning data are not anatomically the same as the feature points (input points), the learned model obtaining unit 43 may calculate, by predetermined calculation, the coordinates of the same feature points as the feature points (input points). For example, if the feature points set for the learning data are three points including the cardiac apex, the left valve annulus, and the right valve annulus, the learned model obtaining unit 43 may calculate the midpoint between the left valve annulus position and the right valve annulus position and obtain the calculated position as the midpoint between the left and right valve annuluses, thereby generating the coordinate information of two feature points that are the cardiac apex and the midpoint between the left and right valve annuluses.

Reversely, if the feature points (input points) obtained in step S202 are a total of three points including the cardiac apex, the left valve annulus, and the right valve annulus, and the feature points set for the learning data are two points including the cardiac apex and the midpoint between the left and right valve annuluses, for example, the learned model obtaining unit 43 may calculate the positions of the left valve annulus and the right valve annulus by template matching using the midpoint between the left and right valve annuluses as the starting point.

Also, if the contour information of the target in the learned model includes the coordinates of these feature points, the learned model obtaining unit 43 may obtain the coordinate values of the predetermined feature points from the contour information. If points whose relative positional relationships to the feature points are known are included as the contour information of the target in the learning data, the learned model obtaining unit 43 may calculate the coordinate values of the predetermined feature points from the contour information. In addition, the feature point coordinates in each sample of the learning data may be obtained using any known method.

(Step S303: Coordinate Transformation into Normalized Space)

In step S303, using the feature point coordinates obtained for each sample of the learning data in step S302, the learned model obtaining unit 43 performs coordinate transformation for the pixel value information of the image of each sample of the learning data and the contour information of the target, thereby normalizing these. Based on the positions (coordinates) of the feature points in the image of each learning case, the learned model obtaining unit 43 coordinate-transforms the image and the contour line in the image into a normalized space, thereby generating a normalized image and a normalized contour. At this time, the learned model obtaining unit 43 executes coordinate transformation such that the coordinates of the feature points after the coordinate transformation indicate the same positions in all samples of the learning data (for each type of feature points). That is, all samples of the learning data are coordinate-transformed into a normalized space normalized by the coordinate values of the feature point coordinates.

Coordinate transformation processing (normalization processing) into the normalized space will be described in detail with reference to FIG. 4A. If coordinate transformation is not performed, the position where the target exists and its size and tilt vary in each sample image of the learning data. By coordinate transformation, the contour information of the target (for example, the right ventricle) in each sample image of the learning data is transformed as shown in FIG. 4A.

Figure 4A:
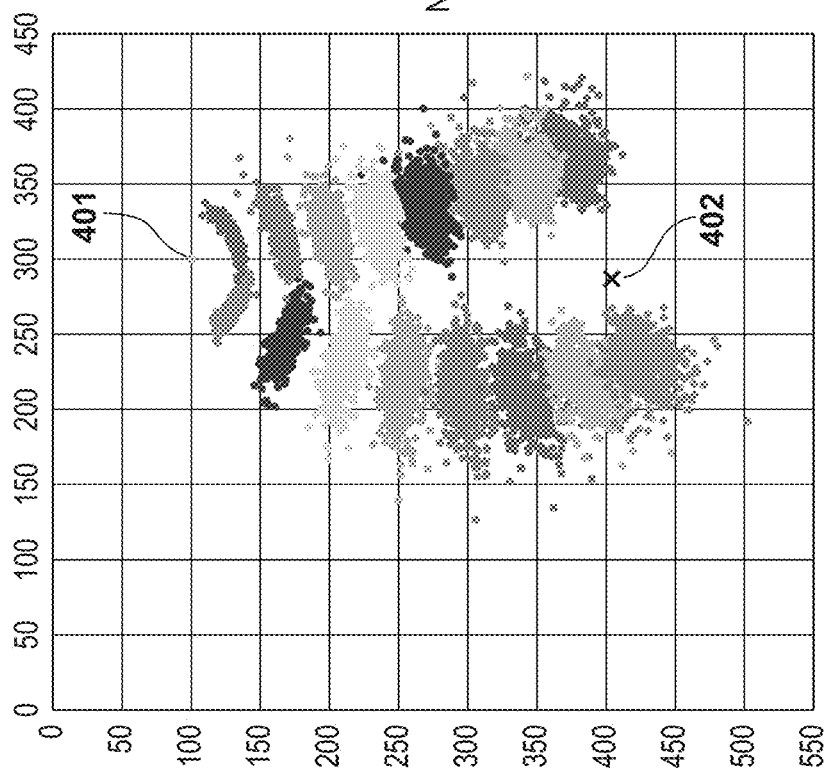
FIG. 4A is a view for explaining coordinate transformation processing (normalization processing) to a normalized space.

FIG. 4A shows an example of a result of coordinate-transforming (normalizing) the contour information of right ventricles in the learning data of about 500 cases such that two points, that is, a cardiac apex 401 and a midpoint 402 between left and right valve annuluses match. In FIG. 4A, the contour information is expressed by the set of the coordinate values of 17 contour point groups (that is, Np=17). In the display, the 17 contour point groups are displayed in different colors such that these can be identified. That is, the number of points in a specific color (for example, black) matches the number of samples (about 500) of the learning data. Also, one point in the contour points representing the contour information in this example represents the cardiac apex 401 that is a feature point. In FIG. 4A, "x" indicates the midpoint 402 between left and right valve annuluses. At this time, the cardiac apexes 401 are coordinate-transformed into a normalized space such that these have the same coordinates in all samples, and are therefore displayed as one point in FIG. 4A. In fact, points as many as the samples overlap.

In FIG. 4A, the abscissa represents the x direction, and the ordinate represents the y direction. That is, it can be found that the cardiac apex 401 has coordinate values (300, 100), the midpoint 402 between left and right valve annuluses has coordinate values (300, 400), and the inclination of an axis (long axis) that connects the cardiac apex 401 and the midpoint 402 between left and right valve annuluses is coordinate-transformed such that the axis matches the y-axis. The processing of performing coordinate transformation using two feature points is executed by calculating a coordinate transformation matrix for aligning the position, angle, and scale by the learned model obtaining unit 43 on a sample basis and applying the coordinate transformation matrix to each coordinate point of the pixel value information and the contour information of the sample.

Note that in the following explanation, in each image of the learning data after coordinate transformation, the pixel count in the x direction is Nx, and the pixel count in the y direction is Ny. That is, the total number of pixels that form each image of the learning data after coordinate transformation is Nx×Ny. At this time, the pixel count Nx in the x direction and the pixel count Ny in the y direction need to be sizes capable of including the contour information after coordinate transformation. In the example shown in FIG. 4A, it is found that the contour information after coordinate transformation is distributed in a range including a pixel count of 450 in the x direction and a pixel count of 550 in the y direction. In this case, as the contour information after coordinate transformation, the pixel count Nx in the x direction needs to include at least the pixel count of 450, and the pixel count Ny in the y direction needs to include at least the pixel count of 550.

In this embodiment, both the pixel count Nx in the x direction and the pixel count Ny in the y direction are 600. However, the pixel count Nx in the x direction and the pixel count Ny in the y direction need not always be the same value.

In this embodiment, an example in which learning data is coordinate-transformed (normalized) using two feature points has been described. However, the learned model obtaining unit 43 can also perform normalization using feature points in a number other than 2. For example, if only one point (for example, the cardiac apex) is used as a feature point, the learned model obtaining unit 43 performs normalization by coordinate transformation for aligning feature point positions by translation. If three points (for example, the cardiac apex and the positions of the left and right valve annuluses) are used as feature points, the learned model obtaining unit 43 performs normalization by affine transformation for aligning the positions of the three points. If four or more points are used as feature points, the learned model obtaining unit 43 performs normalization by non-rigid body transformation for matching four points. As the non-rigid body transformation in this case, the learned model obtaining unit 43 can use a known method such as spline deformation or FFD (Free Form Deformation).

Note that when coordinate-transforming (normalizing) learning data using two feature points, the learned model obtaining unit 43 may use the position of the main feature point (for example, the cardiac apex) to align the positions, and use the other feature point (for example, the midpoint between the left and right valve annuluses) only to align the axial direction in the normalized space. In this case, the learned model obtaining unit 43 does not align the scale of the other feature point (midpoint between the left and right valve annuluses) and aligns the inclination of the axis that connects the main feature point (cardiac apex) and the other feature point (midpoint between the left and right valve annuluses) with the axial direction (for example, the y-axis direction) in the normalized space.

Similarly, when using three points, the learned model obtaining unit 43 may apply a normalization method for aligning the position of the main feature point (for example, the cardiac apex) and matching the other feature point as much as possible within the range of rotation and same-size transformation. The learned model obtaining unit 43 may use any other known normalization method if it is a method of performing geometric normalization using the coordinates of a common feature point.

(Step S304: Augmentation of Learning Data)

In step S304, the learned model obtaining unit 43 performs learning data augmentation processing (data augmentation) in the normalized space coordinate-transformed in step S303. The learned model obtaining unit 43 functions as a deformation unit, and generates a deformed image and a deformed contour by adding deformations (variation values) to the normalized image and the normalized contour in a state in which the positions of the feature points in the normalized space are fixed to the same positions. The learned model obtaining unit 43 then obtains a learned model based on the deformed image and the deformed contour. Based on learning data (augmented learning data) generated by adding the deformed image and the deformed contour to the learning data, the learned model obtaining unit 43 obtains the learned model.

In the state in which the positions of the feature points are fixed to the same positions, the learned model obtaining unit 43 functioning as a deformation unit adds a variation value for translating a position in the normalized space, thereby generating the deformed image and the deformed contour. Also, the learned model obtaining unit 43 adds a variation value for rotation in the normalized space, thereby generating the deformed image and the deformed contour. In addition, the learned model obtaining unit 43 adds the variation value of a position obtained by increasing or decreasing the relative distance to the fixed position of each feature point, thereby generating the deformed image and the deformed contour.

The processing of this step will be described in detail with reference to FIG. 4B. FIG. 4B shows an average contour shape obtained by averaging the pieces of contour information of all learning data in the normalized space. Note that in FIG. 4B, the inside line is the contour line. The outside line is a line drawn while keeping a predetermined width to the contour line, and a heart wall is expressed by this. When the learned model obtaining unit 43 performs the augmentation processing, if the whole contour is translated, or rotation is applied, the positions of the cardiac apex 401 and the midpoint 402 between left and right valve annuluses change. On the other hand, as indicated by an arrow 403 in FIG. 4B, if deformation is done by enlarging or reducing (scaling) the average contour shape in the x-axis direction with respect to the axis connecting the cardiac apex 401 and the midpoint 402 between left and right valve annuluses as the center, the positions of the cardiac apex 401 and the midpoint 402 between left and right valve annuluses do not change. In this way, the learned model obtaining unit 43 deforms each sample of the learning data such that the coordinate values of each feature point used in the coordinate transformation do not change, thereby performing learning data augmentation processing.

More specifically, for each sample (a set of an image and contour information) of the learning data after normalization, the learned model obtaining unit 43 executes scaling in the x-axis direction using a plurality of magnifications in a state in which the positions of the two feature points (in the example shown in FIG. 4B, the positions of the cardiac apex 401 and the midpoint 402 between left and right valve annuluses) used for normalization are fixed. For example, the learned model obtaining unit 43 generates N augmented data by performing scaling processing for each sample using a plurality of magnifications (for example, 0.8, 0.9, 1.1, 1.2, . . . ), and combines the sample data as the base and the N data obtained by the scaling processing, thereby augmenting the number of samples to (N+1) times. Alternatively, the learned model obtaining unit 43 may perform scaling processing using magnifications generated at random for each sample. How to select the number of data and the magnification setting method in the augmentation processing are not limited to the above-described examples, and the learned model obtaining unit 43 can execute the learning data augmentation processing using any other method.

If coordinate transformation is performed using two feature points at fixed positions, the learned model obtaining unit 43 can perform the augmentation processing by coordinate transformation other than scaling processing in the x-axis direction. For example, data obtained by applying nonlinear deformation to a sample (a set of an image and contour information) and then performing translation/rotation/scaling processing such that the two feature point positions return to predetermined coordinates in the normalized space can be used as augmented data.

Note that in this embodiment, augmentation processing in a case in which learning data is normalized using two feature points has been described. However, the learned model obtaining unit 43 can similarly perform the learning data augmentation processing even in a case in which learning data is normalized using feature points in a number other than 2. For example, if one feature point (for example, the cardiac apex position) is used for normalization, the learned model obtaining unit 43 can perform the augmentation processing by performing translation, rotation, and scale transformation such that the position of the one feature point does not change.

In addition, if three feature points (for example, the positions of the cardiac apex and the left and right valve annuluses) are used for normalization, the learned model obtaining unit 43 can perform the augmentation processing by calculating a deformation for expanding or contracting the right ventricle region in a state in which the three points are fixed.

If four or more feature points are used for normalization, the learned model obtaining unit 43 can perform the augmentation processing by fixing the four or more feature points as control points and varying the weights of deformation parameters at random.

In addition, the learned model obtaining unit 43 can impose restrictions to prevent the contour that has undergone the augmentation processing from obtaining a statistically impossible shape. If the variation value falls outside a predetermined allowable range, the learned model obtaining unit 43 limits addition of the variation value. The learned model obtaining unit 43 sets the allowable range based on the average value and standard deviation of the learning data after coordinate transformation into the normalized space. For example, the average value and the standard deviation value (a) of a parameter to be augmented (the scaling component in the x-axis direction if two points including the cardiac apex position and the midpoint between the left and right valve annuluses are used) are calculated from the learning data after coordinate transformation into the normalized space, and augmentation processing is performed within the range of average±2σ. When the range of learning data to be used for augmentation processing is limited in this way, it is possible to reduce the possibility that a statistically impossible shape is used as learning data by augmentation processing, and the quality (accuracy) of a learned model lowers.

(Step S305: Construction of Learned Model)

In step S305, the learned model obtaining unit 43 statistically analyzes all samples of the learning data augmented in step S304, thereby constructing a learned model. All processes of this step are performed in the normalized space.

As described concerning step S303, the image handled in this embodiment is an image formed by Nx×Ny pixels. The pixel value information of the image according to this embodiment is formed as a column vector in which the pixel values of the pixels are arranged in the raster scan order of the image. That is, setting the origin (0, 0) at the upper left corner of the image shown in FIG. 4B, and expressing the pixel value at a pixel (x, y) as I(x, y), pixel value information a of the image is defined by $$a = \{I(0, 0), I(1, 0), \ldots, I(Nx-1, Ny-1)\}^T \quad (1)$$

Also, contour information in this embodiment is expressed by the coordinates of the predetermined number (Np) of point groups (contour point groups). For these points as well, setting the origin (0, 0) at the upper left corner of the image, the coordinates are expressed as (x, y) using coordinate values along the x-axis and the y-axis. When the first point is defined as p1, the coordinates of the point p1 are (x1, y1). The contour information of the target in this embodiment is formed as a column vector with Np×2 elements, in which the x-coordinate values and the y-coordinate values of the points arranged on the contour of the target are arranged. Contour information b representing the right ventricle is defined by $$b = \{x1, y1, x2, y2, \ldots, xNp, yNp\}^T \quad (2)$$

After the pixel value information a and the contour information b are obtained, the learned model obtaining unit 43 connects the column vectors, thereby generating one column vector in which the two pieces of information (the pixel value information a and the contour information b) are connected. That is, for one sample, the learned model obtaining unit 43 generates one column vector including elements corresponding to the pixel value information g and elements corresponding to the contour information b of the target. That is, the learned model obtaining unit 43 generates data c given by $$c = \{I(0, 0), I(1, 0), \ldots, I(Nx-1, Ny-1), x1, y1, x2, y2, \ldots, xNp, yNp\}^T \quad (3)$$

Here, since the pixel value information of the image and the contour information of the target have variances of different magnitudes, the learned model obtaining unit 43 may add a weight to at least one of the pixel value information of the image and the contour information of the target. At this time, the learned model obtaining unit 43 may add weights to the pixel value information and the contour information in accordance with the magnitudes of the variances of the pixel value information and the contour information of the learning data such that the variances of the pixel value information and the contour information become equal or obtain a predetermined balance. Alternatively, the learned model obtaining unit 43 may add weights to the pixel value information and the contour information using weight set by the user via the operation unit 35.

For each sample (a set of an image and contour information) included in the learning data (after augmentation), the learned model obtaining unit 43 generates the data c in which the pixel value information and the contour information are connected in accordance with the above-described procedure. The learned model obtaining unit 43 then performs statistical analysis for a data group formed by the data c of all samples included in the learning data and obtains a partial space. As the statistical analysis, the learned model obtaining unit 43 can use, for example, a known method such as PCA (Principal Component Analysis), and can also use another method such as Kernel PCA or Weighted PCA. The learned model obtaining unit 43 obtains a learned model by principal component analysis based on the PCA (Principle Component Analysis) method using, as input data, an image obtained by capturing a predetermined target and the contour of the target. By performing the principal component analysis, the learned model obtaining unit 43 calculates an average vector and an eigen vector concerning the data c in which the pixel value information and the contour information are integrated, and an eigen value corresponding to each eigen vector. Here, when an average vector (c bar) and an eigen vector e of the data c in which the pixel value information and the contour information are connected, and a coefficient g corresponding to each eigen vector e are used, a point d that exists in the partial space concerning the learning data can be expressed by $$d = \bar{c} + \sum_{i=1}^{L} g_i e_i \qquad (4)$$

Here, c bar indicates the average vector of the data c, $e_i$ is the eigen vector in the ith base, and $g_i$ is a coefficient corresponding to the eigen vector. In addition, L represents the number of eigen vectors used in the calculation. A detailed value of the number L of eigen vectors can be decided based on a cumulative contribution ratio calculated from the eigen values. For example, the cumulative contribution ratio (for example, 95%) is set as a threshold in advance, and the learned model obtaining unit 43 calculates the number of eigen vectors for which the cumulative contribution ratio is 95% or more and sets the number as L. Alternatively, the learned model obtaining unit 43 may set the number of eigen vectors set by the user as the L.

As the final processing of step S305, the learned model obtaining unit 43 stores the partial space information of the learning data obtained as the result of the above-described statistical analysis as a learned model in the RAM 33. Here, the partial space information is information defining a partial space and includes, for example, the information of an eigen vector and an average vector, which form the partial space.

The above-described learned model obtaining processing executed in step S203 by the learned model obtaining unit 43 is processing independent of contour estimation executed by the apparatus (image processing apparatus 10) for the input image. Hence, the processing of step S203 may be executed in advance, and the generated learned model may be stored in a storage device (for example, the database 22 or the storage unit 34). In this case, in step S203, the learned model obtaining unit 43 performs processing of reading out the learned model generated in advance from the storage device and storing it in the RAM 33. When the learned model is generated in advance, the processing time when performing the contour estimation processing of the target in the input image can be shortened. Note that the learned model generation processing may be performed in accordance with the procedure shown step S203 by another apparatus different from the image processing apparatus 10.

Also, in this embodiment, an example in which data obtained by arranging the pixel values of the entire image in the raster scan order is used as the pixel value information has been described. However, another feature amount (for example, a feature amount concerning the texture of the image) concerning a pixel value may be used as the pixel value information. Furthermore, in each sample of learning data, data obtained by arranging the pixel values of a partial image representing a part of the image may be used as the pixel value information, or data obtained by arranging only pixel values on the periphery of the contour of the target in the image may be used as the pixel value information.

Alternatively, data (vector) obtained by arranging principal component scores which are obtained by projecting the image on a principal component space obtained by principal component analysis of the image of each sample included in the learned model may be used as the pixel value information of the image.

For example, the learned model obtaining unit 43 calculates the pixel value information $\underline{a}$ for each of the samples included in the learning data, and then executes principal component analysis for the data group of the pixel value information $\underline{a}$. In place of the pixel value information $\underline{a}$, the learned model obtaining unit 43 may use the vector of the principal component score of the image of each sample obtained by principal component analysis as new pixel value information a' of the sample. If the number of samples in the learning data is smaller than the number of pixels forming the image, the number of dimensions of the pixel value information a' is smaller than the number of dimensions of the pixel value information $\underline{a}$. For this reason, when the vector of the principal component score of the image of each sample is used as the new pixel value information a', the calculation cost of the statistical analysis for the data in which the pixel value information and the contour information are connected can be reduced.

In addition, when a threshold is provided for the cumulative contribution ratio, and the number of dimensions of the principal component scores (that is, the number of eigen vectors) is decreased, the calculation cost can further be reduced.

On the other hand, although the coordinate values of the point groups (contour point groups) representing the contour of the target are used as the contour information of the target, other values may be used. As an example, information in which the results of calculating, for each pixel of the image, a level set function representing the target (for example, a signed distance value from the contour, which is negative inside the target or positive outside) are arranged in the raster scan order may be used as the contour information.

Alternatively, a label image or mask image for discriminating the target from the others may be used as the contour information. Also, like the above-described method of calculating the pixel value information a' from the pixel value information a, the learned model obtaining unit 43 may execute principal component analysis for the data group of the contour information b and use a value obtained by the principal component analysis as new contour information b' in place of the contour information b. That is, when principal component analysis is executed for the data group of the contour information b of the samples included in the learning data, and the vector of the principal component score of the image of each sample is set as the new contour information b' of the sample, the calculation cost of the statistical analysis for the data in which the pixel value information and the contour information are connected can further be reduced. With the above-described processing, the learned model construction processing is ended, and the process returns to step S204 in FIG. 2.

(Step S204: Coordinate Transformation into Normalized Space)

In step S204, the contour estimation unit 44 obtains a normalized image generated by coordinate-transforming the input image into a normalized space such that the positions of the input points match the positions of the feature points in the learned model. That is, using the information of the feature points obtained by the position obtaining unit 42 in step S202, the contour estimation unit 44 coordinate-transforms the input image obtained by the image obtaining unit 41 in step S201 into the same space (that is, a normalized space) as the normalized space in which the learned model is generated. The contour estimation unit 44 then calculates the pixel value information of the input image in the normalized space.

FIG. 5 is a view showing the procedure of contour estimation processing. The processing of this step will be described in detail with reference to FIG. 5. 5A in FIG. 5 is a view showing the relationship between the input image and the feature points (two points including the cardiac apex and the midpoint between the left and right valve annuluses) in a state before coordinate transformation into a normalized space. In this step, the contour estimation unit 44 executes coordinate transformation for the input image by translation, rotation, or scale transformation such that the coordinate values of these feature points on the input image become the same as the coordinates of the feature points in the normalized space in which the learned model is defined.

If the number of feature points obtained by the position obtaining unit 42 is two, the contour estimation unit 44 performs rigid body transformation for translating/rotating the two feature points and scale transformation for increasing or decreasing the distance between the feature points, thereby obtaining a normalized image in which the positions are matched in the normalized space. For example, a position (504 in 5B of FIG. 5) indicating the cardiac apex after the coordinate transformation obtains the same coordinates (300, 100) as the position (401 in FIGS. 4A and 4B) indicating the cardiac apex in the learning data. A position (506 in 5B of FIG. 5) indicating the midpoint between the left and right valve annuluses after the coordinate transformation obtains the same coordinates (300, 400) as the midpoint between the left and right valve annuluses (402 in FIGS. 4A and 4B) in the learning data. The method of coordinate transformation is the same as the method described above concerning step S303. The contour estimation unit 44 then crops the input image such that the number of pixels of the input image after the coordinate transformation becomes Nx×Ny.

Note that in this embodiment, the normalization processing of the input image has been described using an example in which the feature points are two points including the cardiac apex and the midpoint between the left and right valve annuluses. The types of feature points, the number of feature points, and the normalization method using these need to match the method of normalization processing employed by the learned model. In any case, in the coordinate transformation by the contour estimation unit 44, coordinate transformation of the input image into the normalized space is executed using the same method as in step S303. For example, if the number of feature points obtained by the position obtaining unit 42 is three, the contour estimation unit 44 performs affine transformation, thereby obtaining the normalized image generated by transforming the input image into the normalized space. Alternatively, if the number of feature points obtained by the position obtaining unit 42 is four (including a case in which the number of feature points is four or more), the contour estimation unit 44 performs non-rigid body transformation for matching the positions of the obtained feature points by translation or rotation of each feature point, thereby obtaining the normalized image generated by transforming the input image into the normalized space. Here, as the non-rigid body transformation, the contour estimation unit 44 can use a known method such as spline deformation or FFD (Free Form Deformation).

(Step S205: Estimation of Contour Line Information)

In step S205, the contour estimation unit 44 estimates the contour information of the target captured in the input image from the input image coordinate-transformed into the normalized space in step S204 and the learned model obtained in step S203. More specifically, the contour estimation unit 44 estimates the contour information of the target (right ventricle region) captured in the image based on estimation processing (for example, the BPLP method) of estimating, from the information of the pixel values of an unknown image, information representing the posture of an object captured in the image, and stores the result in the RAM 33.

As an example of the estimation processing, the BPLP method is a technique disclosed in, for example, a non-patent literature below. The non-patent literature below discloses a technique (BPLP method) of, using the information of the pixel values of a plurality of images and partial space information concerning data obtained by connecting pieces of information representing the postures of objects captured in the images, estimating, from the information of the pixel values of an unknown image, information representing the posture of an object captured in the image. In other words, this technique is a technique of, for data in which a loss has occurred, interpolating the data of the lost portion from a result of statistical analysis of learning data without a loss.

[Non-Patent Literature] Toshiyuki Amano, et. al. "An appearance based fast linear pose estimation", MVA 2009, IAPR Conference on Machine Vision Applications, 2009 May 20-22.

To apply the BPLP method, when executing estimation processing, for input data, it is necessary to specify which part is known information and which part is unknown information (lost portion).

In this embodiment, for data in which the pixel value information of the input image coordinate-transformed into the normalized space is set as known information, and the contour of the target in the input image is set as unknown information, the contour estimation unit 44 performs estimation processing based on the BPLP (Back Projection for Lost Pixels) method, thereby estimating the contour of the target in the input image. More specifically, the contour estimation unit 44 sets the pixel value information of the input image coordinate-transformed into the normalized space in step S204 as known information, and sets the contour information of the target in the coordinate-transformed input image as unknown information. That is, the contour estimation unit 44 estimates the contour information by replacing information settings such that "the information of the pixel values of an image" in the above-described non-patent literature is set to the pixel value information a̲, and "the information representing the posture of an object" is set to the contour information b.

As the result of the estimation processing, the contour estimation unit 44 obtains a vector f configured to include elements corresponding to the pixel value information a̲ that is the known information and elements corresponding to the contour information b of the target, which is the unknown information, by $$f = E(E^T \Sigma E)^{-1} E^T \hat{f} \qquad (5)$$

Here, f hat on the right side of equation (5) represents the column vector of input data in which a loss has occurred, and the column vector of f hat on the right side is the column vector of data as shown in equation (6) below, in which 0 is set in the portion of the contour information b in data obtained by connecting the pixel value information a̲ and the contour information b, as shown by equation (3).

$$\hat{f} = \{I(0, 0), I(1, 0), \ldots, I(Nx-1, Ny-1), 0, 0, 0, 0, \ldots, 0, 0\}^T \qquad (6)$$

E in equation (5) is a matrix representing the partial space defined by the learned model obtained in step S203. Letting e1, e2, ..., eL be L eigen vectors, for example, the matrix E representing the partial space is given by E=[e1, e2, ..., eL].

E in equation (5) is a square matrix in which diagonal elements corresponding to the pixel value information that is the known information are set to 1, and the remaining elements are set to 0. In other words, the square matrix Σ is a matrix in which elements corresponding to the contour information that is the unknown information in a unit matrix are set to 0. In this embodiment, the square matrix Σ is a square matrix whose one side has a size of Nx×Ny+Np×2 (the number of dimensions of the pixel value information a̲+the number of dimensions of the contour information b), and is a matrix in which Np×2 diagonal elements corresponding to the number of dimensions of the contour information b are 0, and the remaining diagonal elements are 1. The square matrix Σ is given in a form indicated by $$\Sigma = \begin{bmatrix} 1 & \cdots & 0 \\ \vdots & \ddots & \vdots \\ 0 & \cdots & 0 \end{bmatrix} \qquad (7)$$

Note that in this embodiment, even if the input image is arbitrary, the portion set as unknown information does not change (always "0" corresponding to the portion of the contour information b). For this reason, at the point of time when the learned model obtaining unit 43 calculates the partial space information in the learned model obtaining processing of step S203, the contour estimation unit 44 can calculate, in advance, a matrix A given by equation (8) below, which is a part of equation (5) obtained by the estimation processing.

$$A = E(E^T \Sigma E)^{-1} E^T \qquad (8)$$

Hence, in the processing of step S203 described above, the contour estimation unit 44 may calculate the matrix A in advance based on equation (8), and the learned model obtaining unit 43 may use the calculation result as the learned model. In this case, in this step, the contour estimation unit 44 calculates the vector f using $$f = A\hat{f} \qquad (9)$$

Note that the matrix A calculated in advance may be stored in a storage device (for example, the database 22 or the storage unit 34), and in the processing of step S203, the learned model obtaining unit 43 may read out the calculation result of the matrix A as the learned model from the storage device. This can reduce the calculation cost concerning the calculation for estimation processing. Note that the calculation result of a part (for example, the portion of $(E^T \Sigma E)^{-1}$) of the matrix A may be stored as the learned model in the storage device (for example, the database 22 or the storage unit 34), and the learned model obtaining unit 43 may perform remaining arithmetic processing of the learned model obtaining processing, or the contour estimation unit 44 may perform remaining arithmetic processing of the estimation processing.

Finally, the contour estimation unit 44 obtains the information of a portion corresponding to the contour information from the vector f representing the result of the estimation processing (in this embodiment, Np×2 elements corresponding to the number of dimensions of the contour information b), and stores the information in the RAM 33.

5C in FIG. 5 is a view schematically showing the estimation result of contour line information. In the normalized space coordinate-transformed by the processing of the preceding step (step S204), contour line information 507 is estimated by the processing of this step.

Note that if the vector of the principal component score of the image of each sample is used as the new pixel value information a' of the sample in place of the pixel value information a̲ when generating the learned model, the portion of I(0, 0) to I(Nx, Ny) in the column vector of equation (6) is replaced with a value calculated by the same method as the calculation method of the pixel value information a'. More specifically, if the pixel value information a' is the principal component score concerning the pixel value information a̲ of the learning image, the contour estimation unit 44 calculates the principal component score of the input image by performing processing of projection to a principal component space based on the input image and the information of the partial space constructed using only the pixel value information a̲ of the learning data.

In addition, if the vector of the principal component score of the image of each sample is used as the new contour information b' of the sample in place of the contour information b when generating the learned model, the contour estimation unit 44 estimates the principal component score of contour point coordinates in the input image as unknown information by the above-described method. In this case, since the contour information of the estimation result does not have the x- and y-coordinates on the contour line, the contour estimation unit 44 transforms values in the estimated principal component space into coordinate values and stores these in the RAM 33.

More specifically, if the contour information b' is the principal component score concerning the contour information of the learning data, the contour estimation unit 44 performs back projection processing based on the principal component score and partial space information constructed using only the contour information of the learning data.

Note that as the calculation method, any method can be used if the method restores loss information in the principal component space. The method is not limited to the above-described BPLP method, and another calculation method can be applied to processing of estimating the contour information of the target.

(Step S206: Coordinate Transformation into Original Space)

In step S206, the contour estimation unit 44 applies transformation reverse to the coordinate transformation into the normalized space, which is executed in step S204, to the result of contour estimation of step S205, thereby returning the result of contour estimation to the original space (of the input image). When the coordinate transformation for returning the result to the original space before the coordinate transformation is performed, the contour line information (507 in 5C of FIG. 5) estimated in the normalized space in step S205 is coordinate-transformed into contour line information (508 in 5D of FIG. 5) in the original space, as shown by 5D of FIG. 5.

(Step S207: Display of Contour Line Estimation Result)

In step S207, the display processing unit 45 displays the input image and the contour information of the target estimated by the contour estimation unit 44 in the image display region of the display unit 36. At this time, the display processing unit 45 can also perform display control to superimposedly display the estimated contour information and the input image. When the estimated contour information and the input image are superimposedly displayed, the user can easily visually confirm how much the estimated contour information matches the input image. In this embodiment, since the contour information of the target is formed by discrete point groups obtained by sampling the contour of the target, the display processing unit 45 may interpolate adjacent points using a known technique such as spline interpolation and then display the contour information on the display unit 36.

If the purpose is to analyze or measure the target, the processing of step S207 is not always necessary, and the estimated contour information may only be stored in a storage device.

Note that in this embodiment, an example in which the coordinate values of contour point groups representing the right ventricle are used as the contour information of the target has been described. A combination of the coordinate values of contour point groups representing two or more targets such as a left ventricle, a left atrium, and a right atrium in addition to the right ventricle may be used as the contour information. In this case, when statistical analysis concerning not only the coordinate values of the point groups representing the right ventricle region but also the coordinate values of all point groups of the two or more targets is executed in step S203, the coordinate values of all point groups of the two or more targets can simultaneously be estimated in step S205.

According to this embodiment, when a learned model statistically analyzed in a normalized space coordinate-transformed using the coordinates of predetermined feature points is used, an accurate contour estimation result can be provided to the user in a state in which the feature points manually input by the user are fixed in the normalized space.

(Modification)

In the first embodiment, an example in which an image handled as an input image or learning data is a two-dimensional ultrasonic image obtained by capturing a heart region has been described. However, the present invention can be executed even if an image obtained by capturing an organ other than a heart or an image other than an ultrasonic image is used.

As an example in which the present invention is applied to an image other than a heart or an image other than an ultrasonic image, for example, processing of estimating the contour line of a femur from a two-dimensional X-ray image obtained by capturing a hip joint region can be performed. In an image obtained by capturing a patient of hip osteoarthritis, it may be impossible to calculate a boundary line by simple image processing such as threshold processing because the pelvis and the femur are close. In this case, three points including the start position, intermediate position, and end position of the joint between a femoral head and the pelvis are manually input, and learned model construction and contour estimation are performed. This can estimate the contour line based on the statistical tendency of the femur shape while making use of the features the input points.

In the above embodiment, an example in which one two-dimensional image (of a single time phase) is used has been described. However, the processing according to this embodiment can also be applied to a case in which a plurality of two-dimensional images (of a plurality of time phases) are used.

For example, in step S201, an image of a heart in an end diastole time phase and an image in an end systole time phase are obtained as input images, and the processing according to the above-described embodiment can be applied to processing of estimating the contour of a heart chamber in each image.

In this case, even in each sample of learning data, an image in the end diastole time phase and its correct answer contour information, an image in the end systole time phase and its correct answer contour information, and the coordinates of predetermined feature points on the image of one representative time phase (for example, the end diastole time phase) are prepared.

In step S202, the position obtaining unit 42 obtains the coordinates of the predetermined feature points (input points) on the image of the representative time phase in the input images. In step S203, when generating a learned model, the learned model obtaining unit 43 coordinate-transforms the image of the representative time phase into a normalized space using the coordinates of the feature points, as described above, and similarly coordinate-transforms the image of the other time phase into the same normalized space (using the coordinates of the feature points of the image of the representative time phase). The learned model obtaining unit 43 then performs the same statistical analysis processing as described above using information obtained by arranging the pixel values of the two images in the raster scan order as the pixel value information a (Nx×Ny×2) and information obtained by sequentially arranging the contour point coordinates of the two images as the contour information b (Np×2×2), thereby generating a learned model.

Also, in step S204, the contour estimation unit 44 normalizes each of the input images by common coordinate transformation using the information of the feature points (input points) of the image of the representative time phase obtained in step S202. In addition, the contour estimation unit 44 executes the processing of step S205 by expanding equation (6) to a mode in which two input images are used. Note that the number of time phases (the number of images) used for estimation is not limited to two, and expansion can similarly be done even if another arbitrary number of time phases (images) are used. Also, the contour estimation by the contour estimation unit 44 need not be performed in all time phases, and, for example, only the contour in the representative time phase may be estimated. In this case, in step S203, only contour point coordinates in the representative time phase are used as the above-described contour information b. Also, in step S205, the contour estimation unit 44 estimates, as loss data, only contour point coordinates in the representative time phase.

In the above embodiment, an example in which a two-dimensional image is used has been described. However, the processing according to the above-described embodiment can also be applied to a case in which an image whose number of dimensions is larger than the two-dimensional image, for example, a three-dimensional image is used. For example, contour estimation of a heart chamber can similarly be performed by applying the processing according to the above-described embodiment to, for example, a three-dimensional transesophageal echocardiographic image (3D-TEE image) captured using a three-dimensional transesophageal probe. In this case, letting Nz be the pixel value in the Z direction, the size of a column vector representing the pixel value information $\underline{a}$ of the image in equation (1) is Nx×Ny×Nz. The contour is expressed by mesh-like contour point groups. As for the number of elements of a vector representing contour information in equation (2), the vector is formed as a column vector including Np×3 contour points.

Note that when performing contour estimation for a 3D-TEE image, a method other than the above-described method can also be used. For example, a predetermined cross section extracted from a three-dimensional image may be defined as a reference cross section, contour estimation of a two-dimensional image may be performed by applying the processing of the first embodiment on the reference cross section, and after that, the contour of a region on the three-dimensional image may be calculated using the contour line on the two-dimensional image as an initial contour. In this case, for example, the long axis of the right ventricle region is calculated from the initial contour, and the image is rotated by 180° with respect to the long axis as the center axis, thereby obtaining the initial contour of the right ventricle region on the three-dimensional image. Then, the initial contour is deformed by a known method such as Active-contour model or snakes, thereby obtaining a final contour. At this time, only the initial contour on the reference cross section (that is, the cross section whose input points are input by the user) is not varied from the initial contour. In this way, the contour of the three-dimensional region can be estimated while fixing the input points input by the user.

This makes it possible to perform accurate contour estimation with the user's intention reflected.

Second Embodiment

An image processing apparatus according to the second embodiment is an apparatus for estimating the contour of a predetermined target from an image, as in the first embodiment. In the first embodiment, the configuration for performing contour estimation using the BPLP method based on statistical analysis has been described. In the second embodiment, a configuration for performing contour estimation using machine learning represented by, for example, a CNN (Convolutional Neural Network) method will be described.

The apparatus configuration of the image processing apparatus according to this embodiment and the flowcharts of processing are the same as in the first embodiment. However, learned model construction processing (step S305) and contour line estimation processing (step S205) are different. The differences from the first embodiment will be described below.

(Step S305: Construction of Learned Model)

In this embodiment, a learned model obtaining unit 43 constructs a learned model using, as the base of the CNN method, VGG16 that is a known CNN model. The VGG16 is a convolutional neural network (CNN method) formed from a total of 16 layers. In the VGG16, since the number of channels of an input image is defined as three, the learned model obtaining unit 43 stores identical pieces of image information in three channels.

Additionally, to adapt the method to the task of contour estimation, a modification is applied to the VGG16 in this embodiment. Since the original VGG16 is a network configured to perform image recognition of 1,000 classes, the number of output parameters of a fully connected layer is 1,000. This is changed to the number of elements to be estimated, that is, Np×2, which equals the number of elements obtained by arranging the x-coordinate values and the y-coordinate values of points arranged on the contour of the target, as in equation (2) in the first embodiment. As the learned model construction method, the same method as the learning method of the known CNN method can be used. In this way, in a normalized space coordinate-transformed in step S304, image information is input, and machine learning using the CNN method for outputting the coordinate information of a contour line is executed. The learned model obtaining unit 43 obtains a learned model based on learning data using the CNN method that inputs an image (image information) obtained by capturing a predetermined target and outputs the contour information (the position of the contour line) of the target in the captured image.

(Step S205: Estimation of Contour Line Information)

In the contour line information estimation method, a contour estimation unit 44 can use the same method as the estimation method of the known CNN. The contour estimation unit 44 estimates the contour of the target in the input image based on learning by the CNN method that inputs the pixel value information of the input image coordinate-transformed into the normalized space and outputs the contour of the target in the input image. That is, using, as the input, the pixel value information of the input image coordinate-transformed into the normalized space in step S204, the coordinate values of Np point groups forming the contour line of the target are estimated. In the estimation, weight information of the CNN method learned in step S305 is used.

According to this embodiment, it is possible to perform contour estimation of the target using the CNN method in accordance with the input points input by the user. Hence, even if, for example, the contour line of the target has many variations, and a learned model based on statistical analysis cannot have a sufficient expression capability, accurate contour estimation can be performed.

Note that in this embodiment, an example in which a CNN model based on the VGG16 is used has been described. The CNN model is not limited to the VGG16, and another model can also be used. For example, a network formed by decreasing the number of layers from that of the VGG16 such that the convolution result can barely cover the entire image may be used. Alternatively, machine learning may be performed by constructing a new model. If the size of the network is reduced, for example, if the apparatus is mounted in an ultrasonic diagnostic apparatus, contour estimation by the CNN method can be executed even if the calculation resource is limited.

Third Embodiment

An image processing apparatus according to the third embodiment is an apparatus for estimating the contour of a predetermined target from an image, as in the first and second embodiments. In this embodiment, a configuration for augmenting learning data by, in each sample of the learning data, giving artificial variations to the coordinates of feature points to be used for normalization will be described. In this embodiment, a learned model obtaining unit 43 functions as a normalization unit, and for new feature points obtained by adding variation values to the positions of feature points, performs normalization processing for coordinate-transforming the image and contour of learning data into a normalized space such that the new feature points with the added variation values in the images of a plurality of cases are located at the same positions, thereby generating a normalized image and a normalized contour. Then, the learned model obtaining unit 43 obtains a learned model based on the normalized image and the normalized contour.

The apparatus configuration of the image processing apparatus according to this embodiment and the flowcharts of processing are the same as in the first embodiment. However, learning data augmentation processing (step S304) is different. The difference from the first embodiment will be described below.

(Step S304: Augmentation of Learning Data)

In step S304, the learned model obtaining unit 43 performs learning data augmentation processing (data augmentation) in the normalized space coordinate-transformed in step S303.

First, for each sample of the learning data after normalization, the learned model obtaining unit 43 varies the coordinate values of each feature point to the upper, lower, left, and right sides by a predetermined amount (gives variation values ($\Delta x$, $\Delta y$)), and records the coordinate values (positions) after the variation. For example, the learned model obtaining unit 43 gives N variations to each of two feature points, thereby obtaining a set of coordinates of $(N+1) \times 2$ feature points, including the positions before the variation. Here, the variation values in the learning data augmentation processing can be decided based on, for example, variations of the coordinates of feature points, which are obtained in advance by causing a sufficient number of users to manually input the coordinates of feature points in a sufficient number of samples. For example, variations of the coordinates of manually input feature points are modeled in advance by a standard deviation, and variation values are generated based on the model.

The model of variations of the coordinates of feature points may be manually input. At this time, the variation of the coordinates of feature points may be modeled for each type of feature points, or a model common to a plurality of feature points may be obtained. If the accuracy of coordinates manually input by the user is high (if a high accuracy can be expected), the variation value of a feature point can be set small. If the accuracy of coordinates manually input by the user is low (if a high accuracy cannot be expected), the variation value of a feature point can be set large.

The learned model obtaining unit 43 adds different variation values based on the position of a feature point that permits variations. For example, since a cardiac apex has a characteristic position on an image, and a high accuracy can be expected, the variation value is set small. Since a midpoint between left and right valve annuluses has no special feature on an image, and a high accuracy cannot be expected, the variation value is set large.

The model of variations of the coordinates of feature points may be decided based on the distribution of pixel values on the periphery of a feature point in each sample. That is, the learned model obtaining unit 43 sets the variation values based on the variance values of pixel values in the peripheral region of a feature point that permits variations. For example, in a small region on the periphery of a feature point, the variances of pixel values in the axial directions are obtained, and a model can be set in accordance with the variances. For example, if variances are large, a model that makes variations small can be set. If variances are small, a model that makes variations large can be set. According to this, for a feature point like a cardiac apex, which has a noticeable feature such as a line or an angle on an image, a model for small variations (small variances) can be applied. For a feature point like a midpoint between left and right valve annuluses, which does not have a special feature on an image, a model for large variations (large variances) can be applied.

Note that this model may be individually obtained for each sample in the learning data after normalization, or a common model may be used by obtaining a representative value based on a plurality of samples. Variation values ($\Delta x$, $\Delta y$) are generated by random numbers such that the distribution of generated variation values complies with the common model.

Alternatively, a representative value of variation values for each feature point may be set in accordance with the distance from each feature point to a contour point. That is, the longer the distance from a feature point to a contour point is, the larger the variation value may be set. The number (N) of coordinates to be generated after the variation may change for each feature point. For example, the number (N) of feature points for which a high accuracy can be expected may be set small, and the number (N) of feature points for which a high accuracy cannot be expected may be set large.

The number (N) of feature points may be manually set, or a value according to a model of variations may be calculated and set based on the above-described variances of pixel values. For example, if the variations of pixel values are small, a value that makes the number (N) of feature points small may be calculated and set. If the variations of pixel values are large, a value that makes the number (N) of feature points large may be calculated and set.

In addition, the variation values may be decided in consideration of, for example, the relative positional relationship between the position of a cardiac apex and a midpoint between left and right valve annulus positions in learning data. For example, if, in all learning data, the relative position of the midpoint between the left and right valve annuluses in the up-and-down direction with respect to the cardiac apex position is 100 pixels on average, and the standard deviation $\sigma$ is ±5 pixels, a variation value of ±10 pixels, which is twice larger than the standard deviation value (that is, $2\sigma$), is set.

Even for the relative position of the midpoint between the left and right valve annuluses with respect to the cardiac apex position in the left-and-right direction, variation values are decided in a similar manner. The number (N) of feature points according to the variation values can be set arbitrary. Here, the coordinates of feature points after the variation are obtained at a total of four points (that is, N=4) including one point on each of the upper and lower sides and one point on each of the left and right sides. Note that the method of setting the number (N) of coordinates to be generated after the variation or the variation value is not limited to the above-described example, and any other method can also be used.

Second, each position in the set of the coordinates of the (N+1)×2 feature points is used as a new feature point position, the learned model obtaining unit 43 newly performs the same coordinate transformation as the coordinate transformation into the normalized space, which is performed in step S303, for each sample of the learning data after the normalization. The learned model obtaining unit 43 thus augments the learning data to which the new feature point positions (variation values) are added to (N+1)×2 times.

Note that when the normalization processing of step S303 is not newly performed for each sample of the learning data after the normalization, and the feature point variation processing and the normalization processing described above are executed for each sample of the learning data before the normalization, augmentation of the learning data can similarly be performed.

Here, positions are varied concerning only the coordinate values of feature points, and the image information of the learning data is not varied. In this way, the learning data can express a situation that even in the same image, the coordinates of feature points manually input to the image can slightly vary between a plurality of users or in the operation of each user.

Also, if a point (contour point) on the contour and the position of a feature point overlap, like a cardiac apex 401 shown in FIG. 4A, that is, if the feature point and the contour point are identical points, the position of the correct answer contour point is not varied. In this case, the position of the cardiac apex manually input by the user and the position of the cardiac apex as an estimated contour point do not always match (these are always match in the first embodiment). Hence, if the position of the cardiac apex manually input by the user includes an error, it is possible to suppress a situation that occurs in the first embodiment, in which the position of the cardiac apex as an estimated contour point is fixed to the wrong position.

Also, in this embodiment, the learned model obtaining unit 43 functioning as a normalization unit can impose restrictions to prevent a variation value to be added to a feature point that permits variations from having a statistically impossible value. If the variation value falls outside a predetermined allowable range, the learned model obtaining unit 43 limits addition of the variation value. The learned model obtaining unit 43 sets the allowable range based on the average value and standard deviation of the learning data after coordinate transformation into the normalized space. For example, the average value and the standard deviation value (σ) of the relative position of a feature point (the midpoint between the left and right valve annuluses) that permits variations with respect to a fixed feature point (cardiac apex position) are calculated from the learning data after coordinate transformation into the normalized space, and a variation value is added within the range of the average±2σ. When the variation value to be added to the feature point that permits variations is limited in this way, it is possible to reduce the possibility that a statistically impossible variation value is used, and the quality (accuracy) of a learned model lowers.

In this embodiment, an example in which the position of each feature point is varied has been described. However, the feature points in each sample of the learning data may be classified into feature points whose positions are fixed in the normalized space and feature points that permit position variations, and variations may be applied to only the feature points that permit position variations. For example, a feature point that is an input point of high accuracy may be a fixed feature point. In this case, for example, the target may be the heart chamber of a heart, and the cardiac apex of the heart chamber may be a fixed feature point. Also, the position of the midpoint between the left and right valve annuluses of the tricuspid valve of the heart chamber may be a feature point that permits variations. If a feature point and a contour point are identical points, the feature point whose position overlaps the contour point may be set to a fixed feature point. Also, when generating a learned model, the user may be allowed to select a feature point to be fixed.

Also, in this embodiment, an example in which the number of feature points is two has been described. The processing of this step can similarly be applied even if the number of feature points is one or three or more. In this case, a learned model can be constructed flexibly in correspondence with the number of input points input by the user and needs for the selection of fixed feature points and feature points that permit variations.

According to this embodiment, a feature point that permits variations is not necessarily fixed by the coordinate values of a point input by the user, and the coordinate values may be changed by reflecting variation values added when constructing the learned model. For this reason, when inputting an input point, contour line information can be estimated without strictly performing position designation, and convenience for the user can be improved.

On the other hand, according to the first embodiment, since feature point positions input by the user are always fixed, a result of contour estimation according to the intention of the user can be obtained (for example, for a user who has confidence in input points). Since these have a tradeoff relationship, both a learned model according to the first embodiment and a learned model according to this embodiment may be generated, and a learned model may be selected in accordance with the preference of the user or various case applications.

Note that for the learning data augmentation processing described in this embodiment, the processing according to this embodiment can be applied to both a case in which the BPLP method is used, as in the first embodiment, and a case in which the CNN method is used, as in the second embodiment.

Fourth Embodiment

An image processing apparatus according to the fourth embodiment is an apparatus for estimating the contour of a predetermined target from an image, as in the first to third embodiments. In the first to third embodiments, a configuration for, when estimating a contour, obtaining input points manually input by a user and performing contour estimation of a target by semiautomatic estimation using the input points has been described. Here, the contour estimation of the target is not limited to processing using the input points, and full-automatic contour estimation that does not depend on input points and semiautomatic contour estimation can adaptively be switched and operated in accordance with a situation.

A plurality of learned models to be explained in this embodiment include a first learned model that does not use points input by a user for contour estimation, and a second learned model that uses input points for contour estimation. The contour estimation that does not use points input by the user for contour estimation is called full-automatic contour estimation in this embodiment, and the contour estimation that uses input points is called semiautomatic contour estimation.

In this embodiment, a configuration for adaptively switching full-automatic contour estimation and semiautomatic contour estimation in accordance with a situation and performing contour estimation will be described. An example in which when performing contour estimation, full-automatic contour estimation is performed first, and if the user judges that semiautomatic contour estimation is necessary, input of input points is accepted, and semiautomatic contour estimation is performed will be described. A case in which it is judged that semiautomatic contour estimation is necessary is a case in which the coordinate information (feature point coordinates) of a feature point (input point) is obtained in step S608 of FIG. 6 to be described below.

The apparatus configuration of the image processing apparatus according to this embodiment is the same as the apparatus configuration (FIG. 1) of the first to third embodiments. However, the functions of a learned model obtaining unit 43 and a contour estimation unit 44 are different from the first to third embodiments.

The learned model obtaining unit 43 obtains learning data from a database 22, and performs statistical analysis for the learning data, thereby obtaining a learned model. The learned model obtaining unit 43 obtains a plurality of learned models that have learned the relationship between an image obtained by capturing a predetermined target and the contour of the target in the image.

In the first to third embodiments, a learned model is defined on a normalized space that is coordinate-transformed using the coordinate information of feature points such that the coordinates of the feature points in each sample are set at the same coordinates. That is, only a learned model for semiautomatic contour estimation is obtained, which assumes that the coordinates of feature points (input points) are input together with an image at the time of contour estimation.

On the other hand, the learned model obtaining unit 43 according to this embodiment obtains a plurality of learned models generated in a normalized space in which the combination of feature points (for example, the combination of positions and number in the target) changes. That is, in this embodiment, not only the learned model for semiautomatic contour estimation but also a learned model for full-automatic contour estimation that does not assume input of feature point coordinates is obtained. As described above, the learned model obtaining unit 43 according to this embodiment obtains two types of learned models, that is, the learned model for semiautomatic contour estimation and the learned model for full-automatic contour estimation.

The contour estimation unit 44 estimates the contour of a target in an input image using a learned model selected (to change the type of the learned model) from a plurality of learned models based on the presence/absence of input points input by the user and a normalized image coordinate-transformed into the normalized space of the learned model. If no input point is input, the contour estimation unit 44 estimates the contour of the target in the input image using the first learned model that does not use points input by the user for contour estimation. If input points are input, the contour estimation unit 44 estimates the contour of the target in the input image using the second learned model that uses the input points for contour estimation.

When performing contour estimation using the learned model for full-automatic contour estimation, the contour estimation unit 44 obtains a normalized image generated by coordinate-transforming the input image into the same normalized space as the normalized space in which the learned model for full-automatic contour estimation was generated. The contour estimation unit 44 then estimates the contour of the target in the input image using the selected learned model and the normalized image.

When performing contour estimation using the learned model for semiautomatic contour estimation, the contour estimation unit 44 selects a learned model corresponding to the combination of input points (input points input in step S608) from a plurality of learned models (a plurality of learned models generated in step S602), and obtains a normalized image generated by coordinate-transforming the input image into the same normalized space as the normalized space of the selected learned model. The contour estimation unit 44 then estimates the contour of the target in the input image using the selected learned model and the normalized image.

As in the first to third embodiments, the contour estimation unit 44 estimates the contour (for example, the position of a contour line as contour information) of the target in the input image obtained by an image obtaining unit 41 by a matrix operation using the learned model obtained by the learned model obtaining unit 43. In the first to third embodiments, only semiautomatic contour estimation is performed. In this embodiment, contour estimation is executed by switching between semiautomatic contour estimation and full-automatic contour estimation in accordance with a situation based on the presence/absence of input points. That is, in a situation in which it is determined to perform full-automatic contour estimation, the contour estimation unit 44 estimates the contour of the target in the input image using the learned model for full-automatic contour estimation by inputting only the input image obtained by the image obtaining unit 41 (without using the coordinates of feature points).

On the other hand, in a situation in which it is determined to perform semiautomatic contour estimation, the contour estimation unit 44 estimates the contour of the target in the input image using the learned model for semiautomatic contour estimation by using the input image obtained by the image obtaining unit 41 and the coordinates of feature points obtained by a position obtaining unit 42.

An example of the processing procedure of the image processing apparatus 10 shown in FIG. 1 will be described next with reference to the flowchart of FIG. 6. Here, since steps S601, S605, and S606 in FIG. 6 are the same processes as steps S201, S206, and S207 in FIG. 2, respectively, a description will be omitted, and differences from the processing shown in FIG. 2 will be described below.

(Step S602: Obtaining of Learned Model)

Figure 7:
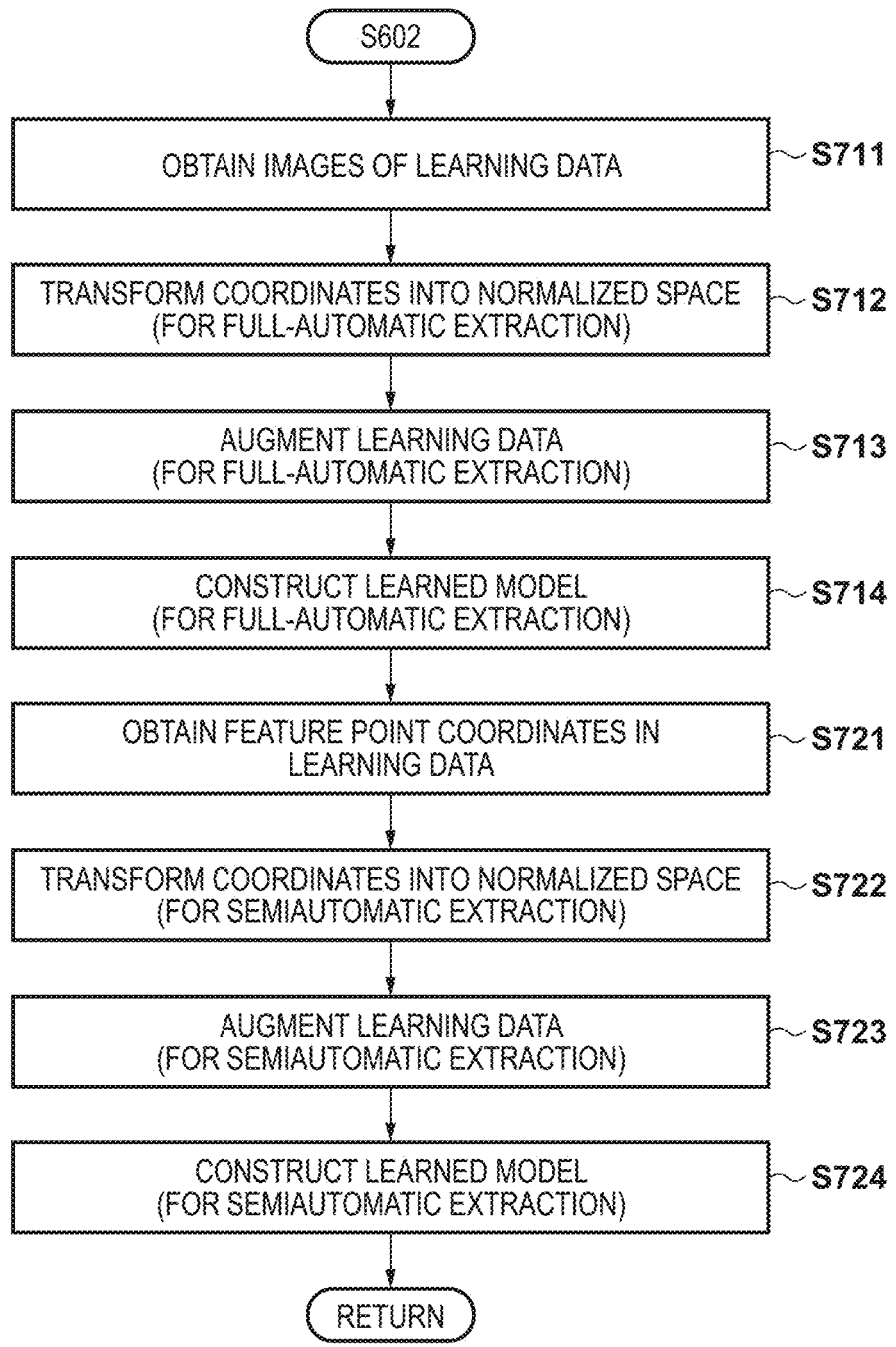
FIG. 7 is a flowchart showing an example of the procedure of learned model obtaining processing according to the fourth embodiment.

In step S602, the learned model obtaining unit 43 constructs a learned model for full-automatic contour estimation and a learned model for semiautomatic contour estimation from learning data obtained from the database 22. FIG. 7 is a flowchart showing an example of the procedure of learned model obtaining processing according to the fourth embodiment. Details of processing to be performed by the learned model obtaining unit 43 will be described below with reference to the flowchart of FIG. 7.

Here, the processes of steps S711 and S721 to S724 in FIG. 7 are the same as the processes of steps S301 to S305 in FIG. 3, respectively. However, unlike the first embodiment, a plurality of learned models in which the types and numbers of feature points are different are obtained.

(Step S712: Coordinate Transformation into Normalized Space (for Full-Automatic Contour Estimation))

In step S712, before construction of a learned model in the next step, the learned model obtaining unit 43 coordinate-transforms image information such as the pixel value information of the image of each sample of learning data into a normalized space in which a learned model for full-automatic contour estimation is defined. At this time, the learned model obtaining unit 43 performs coordinate transformation such that the coordinate values of probe positions (for example, 509 in 5A of FIG. 5) in the sample images of the learned model match with each other. That is, the learned model obtaining unit 43 performs coordinate transformation by translating the image of each sample of the learning data such that a predetermined position (for example, the probe position) in the image obtains predetermined coordinate values.

Note that in this embodiment, an example in which coordinate transformation into the normalized space for full-automatic contour estimation is performed using coordinate information (position information) of one point, that is, the probe position has been described. However, the point is not limited to the probe position, and coordinate transformation into the normalized space may be performed using another position if it is identifiable from only image information such as pixel value information in the image of each sample. In addition, the point (position) serving as the reference for coordinate transformation is not limited to one point, and a plurality of points (positions) can be used as the reference for coordinate transformation. For example, coordinate transformation may be performed by identifying two points including a probe position and a septum center from image information. In this case, as in step S303 of the first embodiment, a coordinate transformation matrix is calculated and applied by performing translation, rotation, and scale transformation such that the two points match. Alternatively, coordinate transformation may be performed as in step S303 by automatically detecting three or more points using a known method.

(Step S713: Augmentation of Learning Data (for Full-Automatic Contour Estimation))

In step S713, the learned model obtaining unit 43 performs learning data augmentation processing (data augmentation) in the normalized space coordinate-transformed in step S712. The learned model obtaining unit 43 can perform augmentation processing for the image of each sample by applying a known general method. For example, the learned model obtaining unit 43 executes a plurality of operations such as translation, rotation, and enlargement/reduction for the pixel value information of each sample image. Note that the learned model obtaining unit 43 can also perform augmentation for changing pixel values such as brightness contrast conversion.

(Step S714: Construction of Learned Model (for Full-Automatic Contour Estimation))

In step S714, the learned model obtaining unit 43 constructs a learned model for full-automatic contour estimation by statistically analyzing the learning data obtained in step S711 and coordinate-transformed in step S712 and all the learning data augmented in step S713.

The normalized space generated by the processing of this step is not a normalized space coordinate-transformed such that the coordinates of feature points such as the cardiac apex and the midpoint between the left and right valve annulus positions match but a normalized space coordinate-transformed by translation, rotation, scale transformation, and the like such that a position (for example, a probe position) in the image of each sample matches.

The processing of this step is different from the first embodiment in the normalized space generation processing, as described above. Remaining processes of this step are the same as the process of step S305 in the first embodiment. With the above-described processing, construction processing of the learned model for full-automatic extraction is ended.

The processes of subsequent steps S721 to S724 are processes for constructing a learned model for semiautomatic estimation and are the same processes as steps S302 to S305 in FIG. 3. However, the processes of steps S721 to S724 are different from the processing in the first embodiment in that the learned model corresponding to the input points is not limited. The learned model obtaining unit 43 executes the processes of steps S721 to S724, thereby obtaining a plurality of learned models with different types and numbers of feature points. With the above-described processing, construction processing of the learned models for semiautomatic extraction is ended, and the process returns to step S603 in FIG. 6.

(Step S603: Coordinate Transformation into Normalized Space)

In step S603, the contour estimation unit 44 functions as a selection unit, and selects a learned model from the plurality of learned models (step S602) based on the presence/absence of input points input by the user. In addition, the contour estimation unit 44 functions as a normalization unit, and obtains a normalized image generated by coordinate-transforming the input image obtained in step S601 into the same normalized space as the normalized space in which the selected learned model was generated. The contour estimation unit 44 then calculates the pixel value information of the input image in the normalized space.

In contour estimation using the learned model for full-automatic contour estimation, since coordinate transformation using the input points cannot be performed in the normalized space, coordinate transformation into the normalized space is performed using the same processing as step S712. That is, if coordinate transformation is performed in step S712 such that a known position (for example, a probe position) in the image of each sample matches, the probe position is similarly used. The contour estimation unit 44 estimates the contour of the target in the input image using the selected learned model and the normalized image.

On the other hand, in contour estimation using the learned model for semiautomatic contour estimation, coordinate transformation using the input points can be performed in the normalized space. If input points are input, the contour estimation unit 44 obtains a normalized image generated by coordinate-transforming the input image into the normalized space such that the positions of the input points match the positions of feature points in the learned model (the learned model for semiautomatic contour estimation). Here, the contour estimation using the learned model for semiautomatic contour estimation is the same as the processing described in the first to third embodiments.

The contour estimation unit 44 changes the processing of this step in accordance with the presence/absence of feature point coordinate obtaining. When the coordinate information (feature point coordinates) of a feature point (input point) is not obtained in step S608 of FIG. 6, if the processing of this step is executed in the order of steps S601, S602, and S603, the contour estimation unit 44 coordinate-transforms the input image into the same normalized space as the normalized space in which the learned model for full-automatic contour estimation was generated. The coordinate transformation processing in this case is the same as the processing of step S712 in FIG. 7.

On the other hand, when the coordinate information (feature point coordinates) of a feature point (input point) is obtained in step S608, that is, if the processing of this step is executed via step S608, the contour estimation unit 44 coordinate-transforms the input image into the same normalized space as the normalized space in which the learned model for semiautomatic contour estimation was generated. The coordinate transformation processing in this case is the same as the processing of step S722 (step S303 in FIG. 3).

After the contour estimation unit 44 coordinate-transforms the input image by the processing of step S712 or S722 (step S303 in FIG. 3), as described above, the contour estimation unit 44 crops the input image such that the number of pixels of the input image after the coordinate transformation becomes Nx×Ny, as in step S204.

(Step S604: Estimation of Contour Line Information)

In step S604, the contour estimation unit 44 estimates the contour information of the target captured in the input image from the input image coordinate-transformed in step S603 and the learned model obtained in step S602. More specifically, the contour estimation unit 44 estimates, based on the BPLP method, the contour information of the target (right ventricle region) captured in the image and stores the result in a RAM 33.

Depending on whether the coordinate information (feature point coordinates) of a feature point (input point) is obtained in step S608 of FIG. 6, the contour estimation unit 44 selects (changes) the learned model to be used for contour information estimation. That is, if the coordinate information (feature point coordinates) of a feature point (input point) is not obtained in step S608 of FIG. 6, the contour estimation unit 44 selects the learned model (step S714) for full-automatic contour estimation in contour information estimation. On the other hand, if the coordinate information (feature point coordinates) of a feature point (input point) is obtained in step S608 (the process passes through step S608), the contour estimation unit 44 selects the learned model (step S724) for semiautomatic contour estimation in contour information estimation.

At this time, as the learned model for semiautomatic contour estimation, a learned model according to the combination (types and number) of feature points obtained in step S608 is used. For example, if a cardiac apex position is input (obtained) as a feature point, the learned model to be used is a learned model normalized using the one point of the cardiac apex position. Note that the processing of this step is the same as the processing of step S205 in the first embodiment except that the learned model is switched in this way.

(Step S607: Obtaining of Instruction as to Whether to End Contour Line Estimation)

In step S607, a display processing unit 45 displays, in the image display region of a display unit 36, a confirmation screen used to obtain an instruction as to whether to end the contour line estimation by the user. For example, the display processing unit 45 displays, on the display unit 36, a dialog box including two buttons "end" and "not end" as instruction input portions used to input an instruction from the user. As the configuration for obtaining an instruction by the user, an arbitrary method of, for example, accepting a predetermined keyboard input can be used. If the instruction that designates "end" of the contour line estimation processing is input (YES in step S607), the contour line estimation processing by the image processing apparatus 10 according to this embodiment is ended. On the other hand, if the instruction that designates "not end" of the contour line estimation processing is input in the determination processing of step S607 (NO in step S607), the process advances to step S608.

(Step S608: Obtaining of Feature Point Coordinates)

In step S608, the position obtaining unit 42 accepts input of the coordinate information of a feature point (input point) by the user. The position obtaining unit 42 obtains the coordinate information of a predetermined feature point and stores it in the RAM 33.

In step S608, the display processing unit 45 displays, on the display unit 36, a superimposed image generated by superimposing the result of estimation in step S606 on the input image. The position obtaining unit 42 obtains, as an input point, the position of the feature point input on the superimposed image by the user.

The feature point to be input by the user is decided depending on which learned model for semiautomatic contour estimation is obtained by the processing of step S602. For example, if no feature point is input yet, that is, if this step (step S608) is executed for the first time, the feature point input in this step is the feature of the "first point". If, in the learned models for semiautomatic contour estimation, a learned model for a case in which the number of feature points is one is normalized using a cardiac apex position, this learned model is selected, and the "predetermined feature point" to be input by the user is decided to the cardiac apex position.

Next, if this step (step S608) is executed in a state in which one feature point has already been input to the cardiac apex position, the feature point input in this step is the feature of the "second point". If, in the learned models for semiautomatic contour estimation, a learned model for a case in which the number of feature points is two is normalized using two points including a cardiac apex position and a midpoint between left and right valve annulus positions, this learned model is selected, and the second "predetermined feature point" to be input by the user is decided to the midpoint between the left and right valve annulus positions.

In this way, one feature point is added every time this step (step S608) is executed. In the subsequent steps, a learned model for semiautomatic contour estimation corresponding to the input one or more feature points is selected, and semiautomatic contour estimation is executed based on the selected learned model for semiautomatic contour estimation.

Note that in step S608 of FIG. 6, the feature points may be added one by one, or a plurality of feature points may be added at once. In this case, the learned model to be selected for semiautomatic contour estimation corresponds to the number of input feature points. For example, if a plurality of feature points (N points) are input, a learned model for semiautomatic contour estimation, which corresponds to N points, is selected, and semiautomatic contour estimation is executed based on the selected learned model.

Note that if the learned model for semiautomatic contour estimation, which corresponds to the number of input feature points, is not obtained by the processing of step S602, the contour estimation unit 44 outputs a curve obtained by interpolating the input feature points as a contour without performing contour estimation using a learned model. For example, if three types of learned models for semiautomatic contour estimation are obtained by the processing of step S602 in correspondence with three types of feature points (one point, two points, and three points), and a feature point corresponding to feature point N=fourth point is input, the contour estimation unit 44 outputs, as a contour, a curve obtained by smoothly interpolating the four points by spline interpolation.

In this embodiment, an example in which full-automatic contour estimation is performed first, and semiautomatic contour estimation is performed if the user judges that it is necessary has been described. However, for example, based on the evaluation result of the quality of the input image input in step S601, processing of skipping full-automatic contour estimation can be performed.

In this case, the image obtaining unit 41 obtains the input image and evaluates the quality of the input image. The contour estimation unit 44 functions as a selection unit and selects a learned model from a plurality of learned models based on the evaluation result of the image quality. In addition, the contour estimation unit 44 obtains a normalized image generated by coordinate-transforming the input image obtained in step S601 into the same normalized space as the normalized space in which the selected learned model was generated. The contour estimation unit 44 then estimates the contour of the target in the input image using the selected learned model and the normalized image.

If it is evaluated that the quality of the input image does not satisfy a threshold, the contour estimation unit 44 estimates the contour of the target in the input image using the second learned model that uses the input points for contour estimation without using the first learned model that does not use the input points for contour estimation.

If it is evaluated, by the image obtaining unit 41 (evaluation unit), that the quality of the input image does not satisfy, a threshold, the display processing unit 45 displays, on the display unit 36, a user interface configured to promote input of a feature point, and the position obtaining unit 42 obtains, as an input point, the position of a feature point input from the user interface. The contour estimation unit 44 performs semiautomatic contour estimation using the second learned model using the coordinates of the input predetermined feature point.

As an example of evaluation of image quality, the image obtaining unit 41 (evaluation unit) obtains an input image in step S601 and then applies Fourier transformation to the input image to transform it into a frequency domain. If there are the level mount of high-frequency components is a predetermined level or more, the image obtaining unit 41 evaluates that the quality of the input image does not satisfy the threshold of noise. Alternatively, the image obtaining unit 41 (evaluation unit) calculates the contrast of the input image, and if the contrast is equal to or less than a predetermined threshold of contrast, evaluates that the quality of the input image does not satisfy the threshold of contrast. If it is evaluated that the quality of the input image does not satisfy the threshold (for example, the threshold of noise or the threshold of contrast), full-automatic contour estimation is skipped, and the contour estimation unit 44 performs semiautomatic contour estimation.

(Modification)

In the processing shown in FIGS. 6 and 7, processing of obtaining a plurality of learned models in step S602, selecting a learned model for semiautomatic contour estimation, which corresponds to a feature point obtained in step S608, and performing semiautomatic contour estimation has been described.

Note that the learned model obtaining processing is not limited to this example. For example, as shown in FIG. 8, the processing can also be divided, depending on the presence/absence of a feature point (input point), into construction processing of a learned model for full-automatic contour estimation (steps S711 to S714) and construction processing of a learned model for semiautomatic contour estimation (steps S721 to S724).

FIG. 8 is a flowchart showing a modification of learned model obtaining processing according to the fourth embodiment. In this flowchart, processing corresponding to step S608 (FIG. 6) is executed before the learned model obtaining processing. That is, before the learned model obtaining unit 43 generates a plurality of learned models, the presence/absence of a feature point is determined in step S800.

For example, if no feature point (input point) is input, and the coordinate information of a feature point (input point) is not obtained (NO in step S800), the learned model obtaining unit 43 advances the process to step S711 to execute construction processing of a learned model for full-automatic contour estimation (steps S711 to S714).

On the other hand, if a feature point (input point) is input, and the coordinate information of the feature point (input point) is obtained in the determination of step S800 (YES in step S800), the learned model obtaining unit 43 advances the process to step S721 to execute construction processing of a learned model for semiautomatic contour estimation, which corresponds to the combination of obtained feature points (the combination of positions and number in the target) (steps S721 to S724).

According to this embodiment, a full-automatic contour estimation result is displayed first, and the learned model is switched in accordance with the interactive input of feature point coordinates, thereby performing semiautomatic contour estimation based on the input feature points. It is therefore possible to perform accurate contour estimation with the user's intention reflected.

According to each embodiment of the present invention, it is possible to perform accurate contour estimation.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-007311, filed Jan. 20, 2021, which is hereby incorporated by reference herein in its entirety.

What is claimed is:

1. An image processing apparatus comprising:
at least one processor; and
at least one memory having stored thereon instructions which, when executed by the at least one processor, cause the image processing apparatus at least to:
obtain a learned model constructed in a normalized space by using learning data including a learning image in which a target is captured, a position of a predetermined feature point of the target, and a position of a contour of the target, which are associated with each other;
obtain an input image for estimation of a contour of a target in the input image;
obtain a position of an input point manually input on the input image by a user;
normalize the input image by coordinate-transforming the input image such that the position of the input point matches the position of the predetermined feature point in the learned model and to obtain a normalized image; and
estimate the contour of the target in the input image using the normalized image and the learned model.

2. The apparatus according to claim 1, wherein a desired learned model is obtained from a plurality of learned models stored in one of an external device and a storage of the image processing apparatus.

3. The apparatus according to claim 1, wherein normalizing the input image includes obtaining the normalized image generated by coordinate-transforming the input image into the normalized space.

4. The apparatus according to claim 1, wherein
obtaining the learned model includes obtaining a plurality of learned models generated in normalized spaces in which a number of the predetermined feature points in the learning data are different from each other, and
normalizing the input image includes selecting a learned model from the plurality of learned models based on a number of input points, and obtaining the normalized image generated by coordinate-transforming the input image into the normalized space of the selected learned model.

5. The apparatus according to claim 4, wherein the contour of the target is estimated using the selected learned model and the normalized image.

6. The apparatus according to claim 1, wherein obtaining the learned model includes obtaining the learned model in which the position of the predetermined feature point of the target is matched in the normalized space.

7. The apparatus according to claim 1, wherein if a number of feature points obtained is two, rigid body transformation for translating and rotating the two feature points is performed, thereby obtaining the normalized image in which the position is matched in the normalized space.

8. The apparatus according to claim 7, wherein if the number of feature points obtained is two, scale transformation for increasing or decreasing a distance between the feature points is performed, thereby obtaining the normalized image in which the position is matched in the normalized space.

9. The apparatus according to claim 1, wherein if a number of feature points obtained is three, affine transformation is performed, thereby obtaining the normalized image generated by transforming the input image into the normalized space.

10. The apparatus according to claim 1, wherein if a number of feature points obtained is four, non-rigid body transformation for matching the positions of the obtained feature points by one of translation or rotation of each feature point is performed, thereby obtaining the normalized image generated by transforming the input image into the normalized space.

11. The apparatus according to claim 1, wherein
the learned model is obtained by principal component analysis based on a PCA (Principle Component Analysis) method using, as input data, an image obtained by capturing the predetermined target and the contour of the target, and
estimation processing is based on a BPLP (Back projection for lost pixels) method for data in which pixel value information of the input image coordinate-transformed into the normalized space is set as known information, and the contour of the target in the input image is set as unknown information, thereby estimating the contour in the input image.

12. The apparatus according to claim 1, wherein
the learned model is obtained based on learning by a CNN (Convolutional Neural Network) method that inputs the image obtained by capturing the predetermined target and outputs the contour of the target in the image, and
the contour in the input image is estimated based on learning by a CNN (Convolutional Neural Network) method that inputs pixel value information of the input image coordinate-transformed into the normalized space and outputs the contour of the target in the input image.

13. The apparatus according to claim 1, wherein the contour of the target in the normalized image is estimated using the learned model and the normalized image, and wherein the instructions, when executed by the at least one processor, further cause the image processing apparatus at least to:
display a result of contour estimation estimated in association with the input image.

14. A medical image capturing apparatus comprising an image processing apparatus defined in claim 1.

15. An image processing apparatus comprising:
at least one processor; and
at least one memory having stored thereon instructions which, when executed by the at least one processor, cause the image processing apparatus at least to:

obtain a plurality of learned models that have learned, based on a position of a predetermined feature point, a contour of a target in an image obtained by capturing the target;

obtain an input image;

select a learned model from the plurality of learned models based on a presence or absence of an input point input by a user;

obtain a normalized image generated by coordinate-transforming the input image into a same normalized space as a normalized space in which the selected learned model was generated;

estimate the contour of the target in the input image using the normalized image and the selected learned model;

display a superimposed image generated by superimposing a result of the estimation on the input image; and evaluate a quality of the input image, wherein the contour of the target in the input image is estimated using the learned model selected from the plurality of learned models based on an evaluation result of the quality and the normalized image coordinate-transformed into the normalized space of the learned model, and wherein if the evaluated quality of the input image does not satisfy a threshold, a user interface configured to promote input of the predetermined feature point is displayed, and a position of the predetermined feature point input from the user interface is obtained as the input point.

16. The apparatus according to claim 15, wherein if the input point is not input, the normalized image generated by coordinate-transforming the input image into the normalized space is obtained such that a predetermined position in the input image matches a predetermined position of the learned model in the normalized space.

17. The apparatus according to claim 15, wherein if the input point is input, the normalized image generated by coordinate-transforming the input image into the normalized space is obtained such that a position of the input point matches a position of a feature point of the learned model.

18. The apparatus according to claim 15, wherein
the plurality of learned models include a first learned model that does not use the input point for contour estimation, and a second learned model that uses the input point for the contour estimation, and
the contour of the target in the input image is estimated using the first learned model if the input point is not input, and
the contour of the target in the input image is estimated using the second learned model if the input point is input.

19. The apparatus according to claim 18, wherein the instructions, when executed by the at least one processor, further cause the image processing apparatus at least to:
obtain, as the input point, a position of a feature point input on the superimposed image by the user,
wherein the contour of the target in the input image is estimated using the first learned model if the input point is not input, and the contour of the target in the input image is estimated using the second learned model if the input point is input.

20. The apparatus according to claim 18, wherein if the evaluated quality of the input image does not satisfy the threshold, the contour in the input image is estimated using the second learned model.

21. An image processing method comprising:
obtaining a learned model constructed in a normalized space by using learning data including a learning image in which a target is captured, a position of a predetermined feature point of the target, and a position of a contour of the target, which are associated with each other;
obtaining an input image for estimation of a contour of a target in the input image;
obtaining a position of an input point manually input on the input image by a user;
normalizing the input image by coordinate-transforming the input image such that the position of the input point matches the position of the predetermined feature point in the learned model and a normalized image is obtained; and
estimating the contour of the target in the input image using the normalized image and the learned model.

22. A storage medium storing a program configured to cause a computer to perform each step in the image processing method according to claim 21.

23. An image processing method comprising:
obtaining a plurality of learned models that have learned, based on a position of a predetermined feature point, a contour of a target in an image obtained by capturing the target;
obtaining an input image;
selecting a learned model from the plurality of learned models based on a presence or absence of an input point input by a user;
normalizing the input image by coordinate-transforming the input image into the same normalized space as a normalized space in which the learned model selected in the selecting was generated and a normalized image is obtained;
estimating the contour of the target in the input image using the normalized image and the learned model selected in the selecting; and
displaying a superimposed result of the estimation on the input image; and
evaluating a quality of the input image,
wherein the estimation is performed so that the contour of the target in the input image is estimated using the learned model selected from the plurality of learned models based on an evaluation result of the input image and the normalized image coordinate-transformed into the normalized space of the learned model, and
wherein if the evaluated quality of the input image does not satisfy a threshold in a step of the evaluating, the displaying is performed such that a user interface configured to promote input of the feature point is displayed, and the obtaining of the position of the input point is performed such that a position of the feature point is input from the user interface as the input point.

* * * * *